US012367797B2

(12) United States Patent
Kwon et al.

(10) Patent No.: US 12,367,797 B2
(45) Date of Patent: Jul. 22, 2025

(54) DISPLAY DEVICE AND DRIVING METHOD THEREOF

(71) Applicant: Samsung Electronics Co., Ltd., Suwon-si (KR)

(72) Inventors: Taek Su Kwon, Suwon-si (KR); Woojoo Kim, Suwon-si (KR); Dongwook Suh, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/329,239

(22) Filed: Jun. 5, 2023

(65) Prior Publication Data

US 2024/0153425 A1 May 9, 2024

(30) Foreign Application Priority Data

Nov. 8, 2022 (KR) ........................ 10-2022-0147934

(51) Int. Cl.
*G09G 3/32* (2016.01)
*G09G 3/20* (2006.01)

(52) U.S. Cl.
CPC ....... *G09G 3/20* (2013.01); *G09G 2310/0275* (2013.01); *G09G 2310/0286* (2013.01); *G09G 2310/0289* (2013.01); *G09G 2310/0291* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 10,460,686 | B2 | 10/2019 | Kwak et al. | |
| 10,878,760 | B2 | 12/2020 | Kim et al. | |
| 10,891,914 | B2 | 1/2021 | Seong et al. | |
| 2005/0030214 | A1* | 2/2005 | Jo | H03M 1/745 341/145 |
| 2009/0058838 | A1 | 3/2009 | Lee et al. | |
| 2017/0004799 | A1* | 1/2017 | Park | G09G 3/3688 |
| 2017/0270863 | A1* | 9/2017 | Suh | G09G 3/3688 |
| 2019/0295474 | A1* | 9/2019 | Kim | G09G 3/3291 |
| 2022/0051606 | A1 | 2/2022 | Kim et al. | |
| 2022/0208079 | A1* | 6/2022 | Jo | G09G 3/32 |

FOREIGN PATENT DOCUMENTS

| | | | |
|---|---|---|---|
| KR | 100880223 | B1 | 1/2009 |
| TW | 202040542 | A | 11/2020 |
| TW | 202105346 | A | 2/2021 |

* cited by examiner

*Primary Examiner* — Joseph R Haley
(74) *Attorney, Agent, or Firm* — Harness, Dickey & Pierce, P.L.C.

(57) ABSTRACT

Some example embodiments provides a display device including: a display panel on which a plurality of data lines are positioned; a source driver including a plurality of output switches connected to the plurality of data lines and supplying a plurality of data signals to the plurality of data lines during a period in which the plurality of output switches are turned on by an output control signal; and a source control circuit that differently controls an on-slew rate of the output control signal for each of a plurality of display areas of the display panel according to a distance between each display area and the source driver.

19 Claims, 17 Drawing Sheets

DISPLAY DEVICE AND DRIVING METHOD THEREOF

CROSS-REFERENCE TO RELATED APPLICATION

This application claims priority to and the benefit of Korean Patent Application No. 10-2022-0147934 filed in the Korean Intellectual Property Office on Nov. 8, 2022, the entire contents of which are incorporated herein by reference.

BACKGROUND

(a) Technical Field

The inventive concepts relate to a display device and a driving method thereof.

(b) Description of the Related Art

Resolution and frame frequency of a monitor, a TV display, and a mobile display using an organic light emitting element or a liquid crystal element are continuously increasing. A high-speed driving method is required, or sufficient, for such a high-resolution/high-frequency driving display. In an output switch control method, which is one of various driving methods for high-speed driving, a plurality of output switches are connected between a source driver, which is a component of a display driving IC (DDI), and a plurality of channels. When the plurality of output switches are turned on, a plurality of data signals may be supplied from the source driver to the plurality of channels, and when the plurality of output switches are turned off, the supplying of the signals may be blocked. In such an output switch control method, electromagnetic interference (EMI) characteristic deterioration occurs according to the switching operation of the output switch.

The above information disclosed in this Background section is only for enhancement of understanding of the background of the inventive concepts, and therefore it may contain information that does not form the prior art that is already known in this country to a person of ordinary skill in the art.

SUMMARY OF THE INVENTION

Some example embodiments provide a display device and a driving method thereof that may improve an electromagnetic interference (EMI) characteristic.

Some example embodiments of the present inventive concepts provide a display device including: a display panel including a plurality of data lines; a source driver including a plurality of output switches connected to the plurality of data lines and configured to supply a plurality of data signals to the plurality of data lines during a period in which the plurality of output switches are turned on by an output control signal; and a source control circuit configured to differently control an on-slew rate of the output control signal for each of a plurality of display areas of the display panel according to a distance between each display area and the source driver.

The source control circuit may include: a plurality of buffers connected to an input terminal, the input terminal configured to receive a switch control signal instructing supply of the plurality of data signals to the plurality of data lines, and an output terminal configured to output the output control signal; and a buffer control circuit configured to operate a buffer according to a distance between each of the display areas and the source driver among the plurality of buffers.

Each of the plurality of buffers may include: two transistors connected between a first power voltage and a second power voltage; and a first transmission gate connected between a gate of a first transistor connected to the first power voltage and the input terminal, among the two transistors, and a node to which the two transistors are connected may be connected to the output terminal.

In each of the plurality of buffers, among the two transistors, a gate of a second transistor connected to the second power voltage may be connected to the input terminal.

The buffer control circuit is configured to generate an on-level slope signal and an on-level inverted slope signal that turn on the first transmission gate and the second transmission gate of the buffer to be operated, and generate an off-level slope signal and an off-level inverted slope signal that turn off the first transmission gate and the second transmission gate of the remaining buffer excluding the buffer to be operated among the plurality of buffers.

Each of the plurality of buffers may further include a second transmission gate connected between a gate of a second transistor connected to the second power voltage and the input terminal, among the two transistors.

The buffer control circuit may be configured to generate an on-level slope signal and an on-level inverted slope signal that turn on the first transmission gate and the second transmission gate of the buffer to be operated, and generate an off-level slope signal and an off-level inverted slope signal that turn off the first transmission gate and the second transmission gate of the remaining buffer excluding the buffer to be operated among the plurality of buffers.

The source control circuit may be configured to decrease a delay period for the output control signal to become an on-level in a horizontal period for each of the plurality of display areas of the display panel as a distance between each display area and the source driver increases.

The source control circuit may be configured to differently control an off-slew rate of the output control signal for each of the plurality of display areas of the display panel according to a distance between each display area and the source driver.

The source control circuit may be configured to decrease a period for the output control signal to become an off-level in a horizontal period for each of the plurality of display areas of the display panel as a distance between each display area and the source driver increases.

The source driving circuit may further include: a shift register configured to receive an image data signal to divide the image data into pixel data units corresponding to each of the plurality of data lines to store a plurality of image data of one pixel row; and a level shifter configured to level-shift the plurality of image data, wherein the shift register is further configured to provide the plurality of image data of the one pixel row to the level shifter according to a latch signal, and the latch signal may include an on-pulse that occurs after the output control signal decreases to an off-level according to an off-slew rate.

The plurality of output switches may be a plurality of transmission gates, the control terminals of the plurality of transmission gates may be configured to receive the output control signals, and inverted control terminals of the plurality of transmission gates may be configured to receive an inverted output control signal of which the output control signal is inverted.

Some example embodiments of the present inventive concepts provide a display device including: a display panel including a plurality of data lines, a plurality of gate lines, and a plurality of pixels connected to the plurality of data lines and the plurality of gate lines; a plurality of output switches including an output terminal connected to one end of each of the plurality of data lines, the plurality of output switches configured to switch according to an output control signal; a plurality of amplifiers including output terminals connected to input terminals of the plurality of output switches; and a source control circuit configured to differently control an on-slewing delay of the output control signal for each of a plurality of display areas of the display panel according to a distance between each display area and the plurality of output switches. The on-slewing delay may be a period during which the output control signal is changed from an off-level to an on-level.

The source control circuit may be configured to control, for each of the plurality of display areas of the display panel, the on-slewing delay of the output control signal to be shorter as a distance between each display area and the plurality of output switches increases.

The source control circuit may be configured to differently control, for each of a plurality of display areas of the display panel, an off-slewing delay of the output control signal according to a distance between each display area and the plurality of output switches, and the off-slewing delay may be a period during which the output control off is changed from an on-level to an off-level.

The source control circuit may be configured to control, for each of the plurality of display areas of the display panel, the on-slewing delay and the off-slewing delay of the output control signal to be shorter as a distance between each display area and the plurality of output switches increases.

The source control circuit may include: a plurality of buffers connected to an input terminal to which a switch control signal instructing supply of the plurality of data signals to the plurality of data lines is inputted and an output terminal to which the output control signal is outputted; and a buffer control configured to operate a buffer according to a distance between each of the display areas and the source driver among the plurality of buffers.

The buffer control circuit may be configured to increase the number of buffers to operate as a distance between each display area and the source driver increases.

Some example embodiments of the present inventive concepts provide a driving method of a display device including a display panel and a plurality of output switches connected to a plurality of data lines, the method including: changing, in a first horizontal period for a first display area of the display panel, the output control signal to an on-level during a first delay period from a starting time point of the first horizontal period; and changing, in a second horizontal period for a second display area of the display panel, the output control signal to an on-level during a second delay period from a starting time point of the second horizontal period, wherein, in the display panel, the first display area may be closer to the plurality of output switches than the second display area, and the first delay period may be longer than the second delay period.

The driving method of the display device may further include: changing the output control signal to an off-level during a third delay period in the first horizontal period; and changing the output control signal to an off-level during a fourth delay period in the second horizontal period. The third delay period may be longer than the fourth delay period.

DETAILED DESCRIPTION

Figure 1:
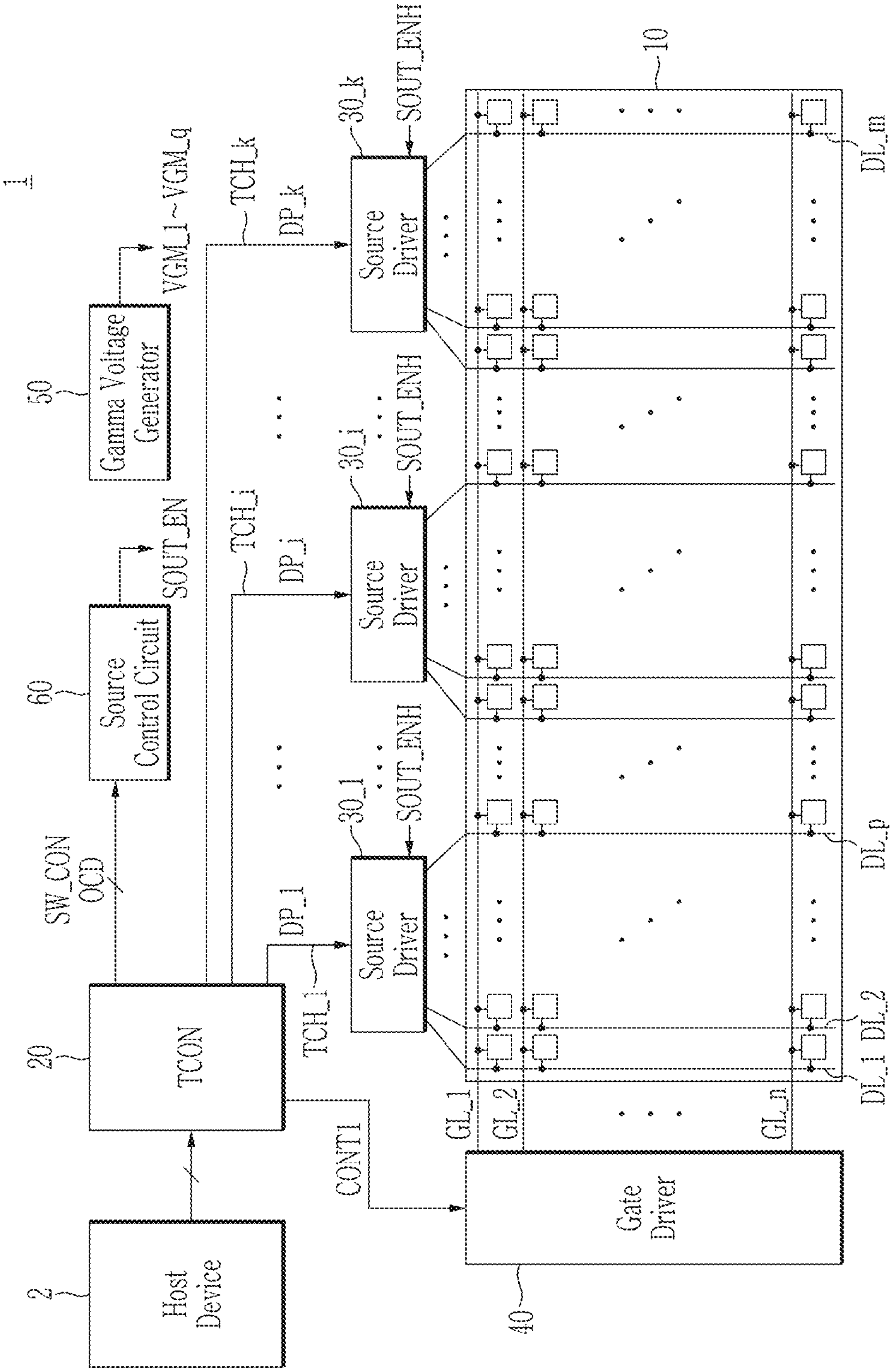
FIG. 1 illustrates a display device according to some example embodiments.

The present inventive concepts will be described more fully hereinafter with reference to the accompanying drawings, in which some example embodiments of the inventive concepts are shown. As those skilled in the art would realize, the example embodiments may be modified in various different ways, without departing from the spirit or scope of the present inventive concepts.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for purpose of distinguishing one constituent element from other constituent elements.

FIG. 1 illustrates a display device according to some example embodiments.

A display device 1 according to some example embodiments may be applied to a liquid crystal display (LCD), an organic light emitting display (OLED), and/or the like, and may be applied to products such as a monitor, a TV display, and/or a mobile display.

The display device 1 may include a host device 2, or the display device 1 and the host device 2 may be implemented as a separate device coupled through an interface. The host device 2 may generate an image signal and/or a control signal to provide them to the display device 1. The image signal is a signal representing an image to be displayed by the display device 1, and the control signal may include a vertical synchronization signal, a horizontal synchronization signal, a data enable signal, a main clock signal, and/or the like required, or sufficient, for the display device 1 to display an image signal. In addition, the control signal may further include a compensation signal indicating compensation information necessary, or sufficient, to perform gamma compensation on the image signal. The host device 2 may be a processor of a set-top box, a computer, and/or a mobile terminal, and may include a graphics processing unit (GPU), a visual processing unit (VPU), and/or the like that may convert an image source into an image signal suitable for the display device 1.

As shown in FIG. 1, the display device 1 may include a display panel 10, a timing controller 20, a plurality of source drivers 30_1 to 30_*k* (wherein k is an integer greater than or equal to 1), a gate driver 40, a gamma voltage generator 50, and/or a source control circuit 60. The timing controller 20, the plurality of source drivers 30_1 to 30_*k*, the gate driver 40, and/or the source control circuit 60, and/or the plurality of source drivers 30_1 to 30_*k*, the gate driver 40, and/or the source control circuit 60, may configure a display driving IC (DDI).

The timing controller 20 may be connected to the plurality of source drivers 30_1 to 30_*k* in a point-to-point method to transmit a data packet including a plurality of image data signals IMD_1 to IMD_k to the plurality of source drivers 30_1 to 30_*k* through a plurality of transmission channels TCH_1 to TCH_k. The point-to-point interface method between the timing controller 20 and the plurality of source drivers 30_1 to 30_*k* illustrated in FIG. 1 is an example, and the present inventive concepts are not limited thereto. For example, instead of the point-to-point method, a multi-drop method may be applied to the display device 1. Alternatively, the plurality of source drivers 30_1 to 30_*k* may be integrated into one configuration.

The display panel 10 may include a plurality of data lines DL_1 to DL_m, a plurality of gate lines GL_1 to GL_n, and a plurality of pixels PX. The plurality of data lines DL_1 to DL_m may be positioned along one direction, the plurality of gate lines GL_1 to GL_n may be positioned along the other direction crossing the one direction, and the plurality of pixels PX may be arranged in a matrix form, and each, or one or more, of the pixels PX may be connected to a corresponding data line and a corresponding gate line. The plurality of pixels PX may be divided into row units according to an arrangement direction of the plurality of gate lines GL_1 to GL_n, and which is referred to as a pixel row. Each, or one or more, of the plurality of pixels PX may include a red (R) subpixel, a green (G) subpixel, and a blue (B) subpixel, and may further include a white (W) subpixel. Each, or one or more, of the plurality of pixels PX may store a data signal supplied to each, or one or more, pixel through a data line connected in synchronization with a gate signal supplied to each, or one or more, pixel through a gate line connected thereto, and may emit light with a grayscale according to the data signal. A pixel is a light emitting element, and may include an organic light emitting diode and/or a liquid crystal element.

The timing controller 20 may receive an image signal and a control signal from the host device 2, may process the image signal to generate an image data signal IMD, and/or may divide the image data signal IMD for each, or one or more, of the plurality of source drivers 30_1 to 30_*k* to divide the plurality of image data signals IMD_1 to IMD_k. The timing controller 20 may generate timing control signals for controlling operation timings of the plurality of source drivers 30_1 to 30_*k* and/or the gate driver 40 based on the control signal received from the host device 2. The timing control signals may include a gate timing control signal CONT1 for controlling the operation timing of the gate driver 40, and/or a plurality of source timing control signals CONT2_1 to CONT2_*k* for controlling the operation timings of the plurality of source drivers 30_1 to 30_*k*. The plurality of source timing control signals may include at least two clock signals synchronized to each, or one or more, of a latch signal, a horizontal period, and/or a vertical synchronization necessary, or sufficient, for the plurality of source drivers 30_1 to 30_*k* to generate a plurality of data signals according to the plurality of image data signals IMD_1 to IMD_k to provide the plurality of data signals to the plurality of data lines DL_1 to DL_m.

The timing controller 20 may classify the plurality of image data signals IMD_1 to IMD_k and the plurality of source timing control signals CONT2_1 to CONT2_*k* for each, or one or more, of the plurality of source drivers 30_1 to 30_*k*, and may generate a plurality of data packets DP_1 to DP_k by encoding each, or one or more, image data signal and the source timing control signal corresponding thereto. The timing controller 20 may transmit the plurality of data packets DP_1 to DP_k to the plurality of source drivers 30_1 to 30_*k* through the plurality of transmission channels TCH_1 to TCH_k. One 30_*i* (i is an integer from 1 to k) of the plurality of source drivers 30_1 to 30_*k* may receive the corresponding data packet DP_i through the corresponding transmission channel TCH_i, and may decode the corresponding data packet DP_i to restore the corresponding image data signal IMD_i and the corresponding source timing control signal CONT2_*i*. In this way, each, or one or more, of the plurality of source drivers 30_1 to 30_*k* may generate a plurality of data signals based on the restored image data signal according to the restored source timing control signal to output them to a plurality of data lines connected to each, or one or more, source driver. Each, or one or more, of the plurality of data signals may be an analog voltage.

The gate driver 40 may sequentially or non-sequentially supply a plurality of gate signals having an on-level for a predetermined (or alternately given) period according to the gate timing control signal CONT1 to a plurality of gate lines.

Switching transistors of the plurality of pixels connected to the corresponding gate line are turned on according to an on-level pulse of the gate signal, so that the plurality of data signals supplied through the plurality of data lines may be written into the plurality of pixels.

By the gate timing control signal CONT1 and the plurality of source timing control signals CONT2_*k*, timing at which the plurality of source drivers 30_1 to 30_*k* supply a plurality of data signals to the plurality of data lines DL_1 to DL_m and timing at which the gate driver 40 supplies an on-level gate signal to each, or one or more, of the plurality of gate lines GL_1 to GL_n may be synchronized with each other.

The gamma voltage generator 50 may generate a plurality of gamma voltages VGM1 to VGM_q (wherein q is an integer greater than or equal to 1) under the control of the timing controller 20. For example, the gamma voltage generator 50 may receive information on a gamma characteristic of the display device 1 from the timing controller 20, and may generate the plurality of gamma voltages VGM1 to VGM_q suitable for a gamma curve according to the gamma characteristic.

Figure 2:
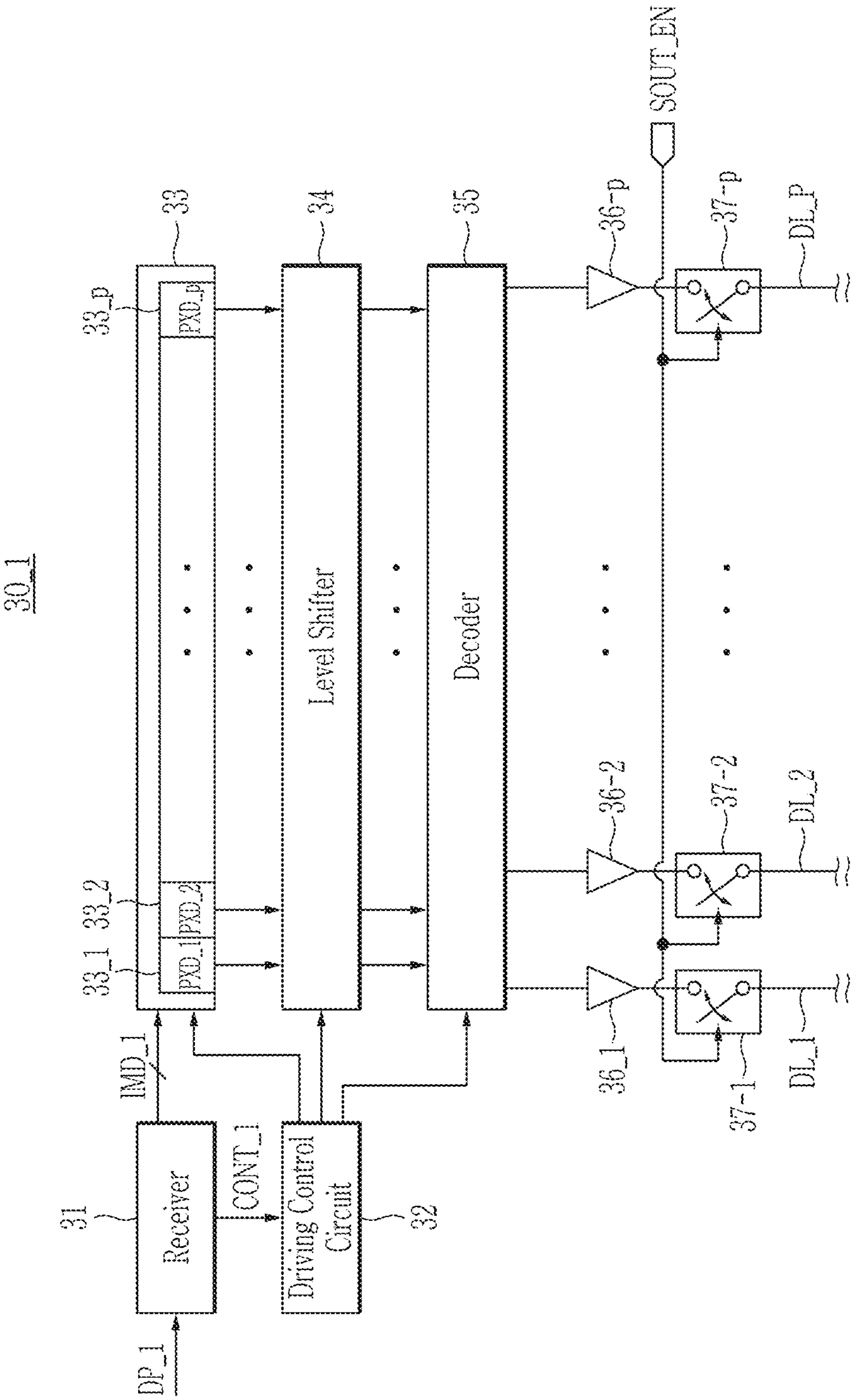
FIG. 2 illustrates a source driver according to some example embodiments.

FIG. 2 illustrates a source driver according to some example embodiments.

FIG. 2 illustrates a source driver 30_1 that is one of the plurality of source drivers 30_1 to 30_*k*. Each, or one or more, of the plurality of source drivers 30_1 to 30_*k* may supply a plurality of data signals to each, or one or more, pixel row through a plurality of data lines corresponding to each, or one or more, horizontal period. A configuration of the source driver 30_1 shown in FIG. 2 and the following description may be applied to all, or one or more, of the plurality of source drivers 30_1 to 30_*k*.

As shown in FIG. 2, the source driver 1 may include a receiver 31, a driving control circuit 32, a shift register 33, a level shifter 34, a decoder 35, a plurality of amplifiers 361 to 36_*p* (p is an integer greater than or equal to 2), a plurality of output switches 37_1 to 37_*p*, and/or a control circuit 38.

The receiver 31 may receive the data packet DP_1 from the timing controller 20 through the corresponding transmission channel TCH_1. The receiver 31 may decode the received serial data packet DP_1 to restore the parallel image data signal IMD_1 and the parallel source timing control signal CONT2_1. The receiver 31 may provide the image data signal IMD_1 to the shift register 33. The driving control circuit 32 may generate a clock signal and/or control signals for controlling an operation of each, or one or more, component of the source driver 30_1 according to the timing control signal CONT2_1 to provide a control signal corresponding to each, or one or more, component.

The shift register 33 includes a plurality of data buffers 33_1 to 33_*p*, and may store the image data signal IMD_1 provided from the receiver 31 in the plurality of data buffers 33_1 to 33_*p* while shifting the image data signal IMD_1 in units of one pixel. In the plurality of data lines DL_1 to DL_p driven by the source driver 30_1, the image data signal IMD_1 for a plurality of pixels in units of a pixel row are stored in the plurality of data buffers 33_1 to 33_*p*. Hereinafter, data obtained by dividing the image data signal IMD_1 in units of pixels is referred to as 'pixel data PXD'. The shift register 33 may provide a plurality of pixel data of one pixel row stored in the plurality of data buffers 33_1-33_*p* to the level shifter 34 according to a latch signal.

The level shifter 34 may shift a digital signal level configuring each, or one or more, of a plurality of pixel data PXD_1 to PXD_p (wherein p is an integer equal to or greater than 2) corresponding to one pixel row to provide it to the decoder 35. For example, an operating voltage range of the decoder 35 may be larger than an operating voltage range of the shift register 33. Accordingly, the level shifter 34 may increase the digital signal level configuring each, or one or more, of the plurality of pixel data PXD_1 to PXD_p to a digital signal level that the decoder 35 may process.

The decoder 35 may receive the plurality of pixel data PXD_1 to PXD_p from the level shifter 34, and may convert each, or one or more, of the plurality of pixel data PXD_1 to PXD_p, which are digital signals, into each, or one or more, of the plurality of data signals DS_1 to DS_p, which are analog signals. The decoder 35 may receive the plurality of gamma voltages VGM-1 to VGM_q (q is an integer of 2 or more) generated by the gamma voltage generator 50, and may generate a plurality of grayscale voltages respectively corresponding to a plurality of grayscales by using the plurality of gamma voltages VGM and a plurality of resistance columns. The decoder 35 may generate each, or one or more, of the plurality of data signals DS_1 to DS_p by selecting one of a plurality of grayscale voltages according to each, or one or more, of the plurality of pixel data PXD_1 to PXD_p. The decoder 35 may be implemented as a digital-analog converter that converts pixel data, which are digital signals, into a data signal, which is an analog signal.

The plurality of amplifiers 36_1 to 36_*p* may receive a plurality of data signals DS_1 to DS_p from the decoder 35, and may output the plurality of data signals DS_1 to DS_p to the plurality of data lines DL_1 to DL_p. Each, or one or more, of the plurality of amplifiers 36_1 to 36_*p* may be implemented as an operational amplifier. An output terminal of the operational amplifier is connected to a negative input terminal (−), a positive input terminal (+) of the operational amplifier is connected to the decode 35, and a corresponding data signal may be inputted to the positive input terminal (+).

The plurality of output switches 37_1 to 37_*p* are connected between the plurality of amplifiers 36_1 to 36_*p* and the plurality of data lines DL_1 to DL_p, and may perform a switching operation under the control of the source control circuit 60. The plurality of output switches 37_1 to 37_*p* perform a switching operation according to an output control signal SOUT_EN provided by the source control circuit 60. The plurality of data signals DS_1 to DS_p may be provided from the plurality of amplifiers 36_1 to 36_*p* to the plurality of data lines DL_1 to DL_p during a period in which the plurality of output switches 37_1 to 37_*p* are turned on by the output control signal SOUT_EN of an on-level. When the plurality of output switches 37_1 to 37_*p* are turned off by the output control signal SOUT_EN of an off-level, supply of the plurality of data signals DS_1 to DS_p to the plurality of data lines DL_1 to DL_p may be blocked.

Figure 3:
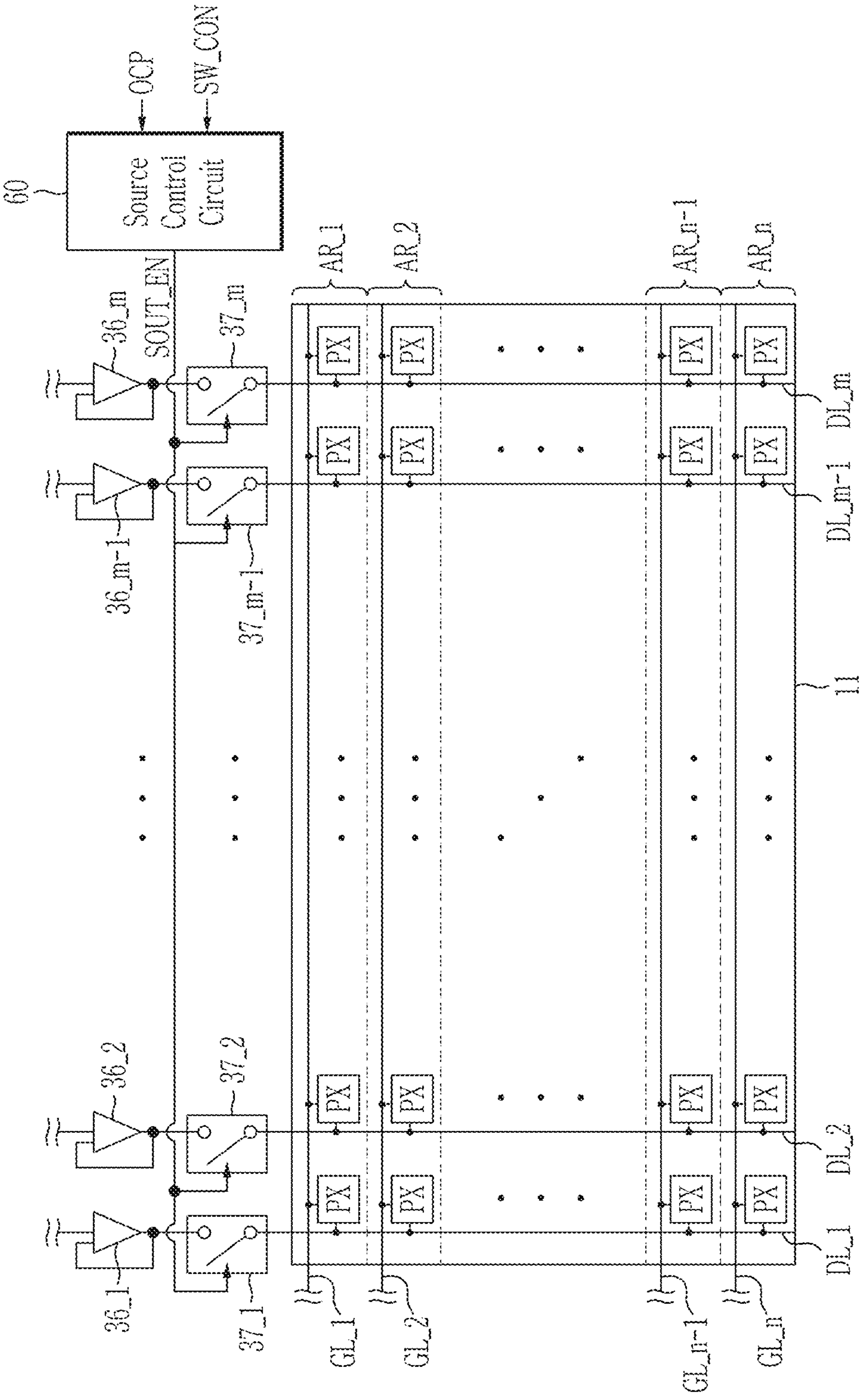
FIG. 3 illustrates a display panel divided into a plurality of areas and a plurality of output switches connected to a plurality of data lines.

FIG. 3 illustrates a display panel divided into a plurality of areas and a plurality of output switches connected to a plurality of data lines.

FIG. 3 illustrates a plurality of display areas AR_1 to AR_n in which the display panel 10 is divided for each, or one or more, of the plurality of gate lines GL_1 to GL_n. However, the present inventive concepts are not limited thereto, and each, or one or more, of the plurality of display areas AR_1-AR_n in the display panel 10 may be divided into two or more gate line units. As shown in FIG. 3, output terminals of the plurality of amplifiers 36_1 to 36_*m* are connected to the plurality of output switches 37_1 to 37_*m*, the plurality of output switches 37_1 to 37_*m* are connected between the plurality of amplifiers 36_1 to 36_*m* and the plurality of data lines DL_1 to DL_m, and a switching operation may be performed according to the output control signal SOUT_EN.

The source control circuit 60 may receive output control data OCD for controlling the output timing of the plurality of data signals DS_1 to DS_m for each, or one or more, of the plurality of display areas AR_1 to AR_n from the timing controller 20. Alternatively, the source control circuit 60 may store output control data. The source control circuit 60 may differently control a slew rate of an output control signal SOUT that controls the output of the plurality of data signals DS_1 to DS_m according to the output control data OCD. Then, the output timing of the plurality of data signals DS_1 to DS_m may be differently controlled according to a position of each, or one or more, of the plurality of display areas AR_1 to AR_n. As a distance between each, or one or more, of the plurality of display areas AR_1 to AR_n and the plurality of source drivers 30_1 to 30_k increases, a load by which the plurality of source drivers 30_1 to 30_k drives the plurality of pixels PX positioned in each, or one or more, display area increases. As the load increases, a time required, or sufficient, for driving to write data to the pixel increases. For example, a load driving the plurality of pixels PX positioned in the display area AR_n among the plurality of display areas AR_1 to AR_n is the largest, and a load driving the plurality of pixels PX positioned in the display area AR_1 among the plurality of display areas AR_1 to AR_n is the smallest. Accordingly, a driving time of the plurality of pixels PX positioned in the display area AR_n is the longest, and a driving time of the plurality of pixels PX positioned in the display area AR_1 is the shortest.

For each, or one or more, of the plurality of display areas AR_1 to AR_n, the source control circuit 60 may reduce, as each, or one or more, display area becomes closer to the plurality of source drivers 30_1 to 30_k, a slew rate of the output control signal SOUT_EN that controls the output the plurality of data signals DS_1 to DS_m of the corresponding display area. Conversely, for each, or one or more, of the plurality of display areas AR_1 to AR_n, the source control circuit 60 may increase, as each, or one or more, display area is further away from the plurality of source drivers 30_1 to 30_k, a slew rate of the output control signal SOUT_EN that controls the output the plurality of data signals DS_1 to DS_m of the corresponding a light. Through this, a slewing delay degree of the output control signal SOUT_EN may vary for each, or one or more, display area. For example, for each, or one or more, of the plurality of display areas AR_1 to AR_n, as each, or one or more, display area becomes closer to the plurality of source drivers 30_1 to 30_k, the slewing delay degree of the output control signal may increase. Conversely, for each, or one or more, of the plurality of display areas AR_1 to AR_n, as each, or one or more, display area is further away from the plurality of source drivers 30_1 to 30_k, the slewing delay degree of the output control signal may decrease. The 'slewing delay' means a period during which a signal is changed from an on-level to an off-level, or from an off-level to an on-level. Specifically, a period in which the output control signal SOUT_EN is changed from an off-level to an on-level may be an on-slewing delay, and a period in which the output control signal SOUT_EN is changed from an on-level to an off-level may be an off-slewing delay. As the slew rate increases, the slew delay of the output control signal SOUT_EN may decrease, and as the slew rate decreases, the slew delay of the output control signal SOUT_EN may increase. As the on-slew rate (or the off-slew rate) of the output control signal (SOUT_EN) according to some example embodiments increases, the on-slew delay (the off-slew delay) may be shortened. In the following description, an increase in the slew rate may mean a decrease in the slew delay, and a decrease in the slew rate may mean an increase in the slew delay.

The source control circuit 60 may determine the slew rate of the output control signal SOUT_EN for each, or one or more, output period according to the output control data OCD, and may generate the output control signal SOUT_EN according to the determined slew rate. As shown in FIG. 3, when each, or one or more, of the plurality of display areas AR_1 to AR_n is divided into one gate line unit (or one pixel row unit), the output period may follow a horizontal period. The source control circuit 60 may adjust at least one of the number and types of buffers that generate the output control signal SOUT_EN according to the output control data OCD.

Figure 4:
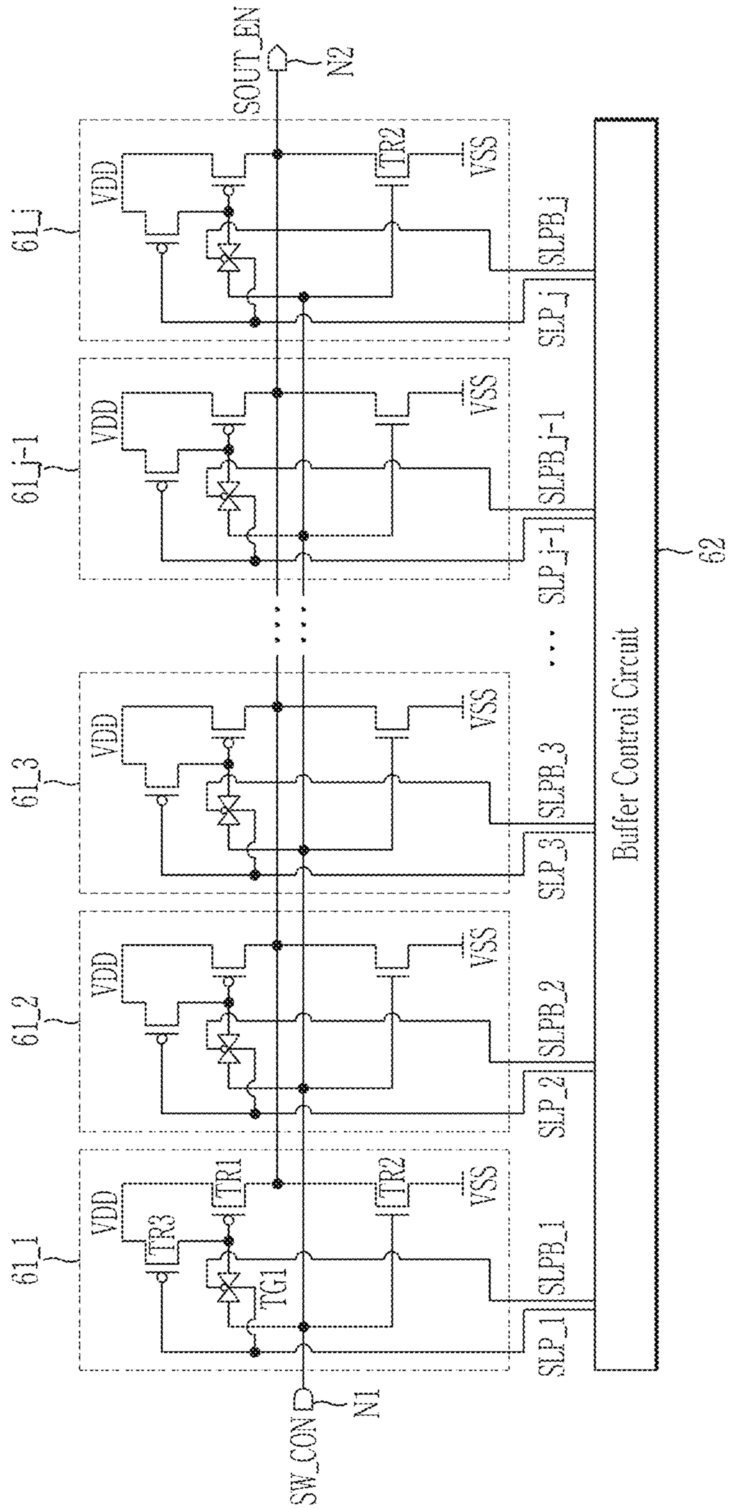
FIG. 4 illustrates a circuit diagram of a source control circuit according to some example embodiments.

FIG. 4 illustrates a circuit diagram of a source control circuit according to some example embodiments.

As shown in FIG. 4, the source control circuit 60 may include a plurality of buffers 61_1 to 61_j and/or a buffer control circuit 62. Since each, or one or more, of input and output terminals of the plurality of buffers 61_1 to 61_j is connected at one node N1 or N2, buffers operated by the buffer control circuit 62 among the plurality of buffers 61_1 to 61_j generate an output according to a switch control signal SW_CON, and a sum of the outputs of the corresponding buffers is the output control signal SOUT_EN. The output control signal SOUT_EN is outputted from the output terminals of the plurality of buffers 61_1 to 61_j.

The plurality of buffers 61_1 to 61_j shown in FIG. 4 may adjust an on-slew rate of the output control signal SOUT_EN. Specifically, an on-level of the output control signal SOUT_EN may be a high level, and an on-slew rate thereof may be a rising slew rate of the output control signal SOUT_EN. A period in which the plurality of data signals DS_1 to DS_m are outputted to each, or one or more, of the plurality of display areas AR_1 to AR_n is a period in which the output control signal SOUT_EN is at a high level. The source control circuit 60 shown in FIG. 4 may change the on-slew rate of the output control signal SOUT_EN at each, or one or more, predetermined (or alternately given) output period in which the plurality of data signals DS_1 to DS_m are outputted in each, or one or more, of the plurality of display areas AR_1 to AR_n. In some example embodiments, since each, or one or more, of the plurality of display areas AR_1 to AR_n corresponds to one pixel row, the predetermined (or alternately given) output period may be a horizontal period. When each, or one or more, of the plurality of display areas AR_1 to AR_n includes two or more pixel rows, the predetermined (or alternately given) output period is a value (horizontal period*Na) obtained by multiplying the number of pixel rows (Na) included in each, or one or more, display area by a horizontal period.

The timing controller 20 may generate the switch control signal SW_CON instructing supply of the plurality of data signals DS_1 to DS_m to the plurality of data lines DL_1 to DL_m in every horizontal period. For example, the timing controller 20 may generate the switch control signal SW_CON that has the same period as the horizontal period of the display device 1 according to a data enable signal, is at an on-level (for example, a low level) for a predetermined (or alternately given) period during the horizontal period, and is at an off-level (for example, a high level) during the remaining period. The timing controller 20 may provide the switch control signal SW_CON to the source control circuit 60. However, the present inventive concepts are not limited thereto, and the source control circuit 60 may receive a data enable signal from the timing controller 20 to generate the switch control signal SW_CON. The plurality of data signals DS are supplied from the plurality of amplifiers 36_1 to 36_*m* to the plurality of data lines DL_1 to DL_m during a predetermined (or alternately given) data output period during the horizontal period, and the plurality of data signals of a next horizontal period are transmitted from the decoder 35 to the plurality of amplifiers 36_1 to 36_*m* during the remaining data update period of the horizontal period, so that the outputs of the plurality of amplifiers 36_1 to 36_*m* may be changed.

The buffer control circuit 62 may generate a plurality of slope signals SLP_1 to SLP_j and a plurality of inverted slope signals SLPB_1 to SLPB_j for controlling the operations of the plurality of buffers 61_1 to 61_*j* according to the output control data OCD. The buffer control circuit 62 may control the on-slew rate of the output control signal SOUT_EN according to each, or one or more, of the plurality of display areas AR_1 to AR_n based on the output control data OCD. Each, or one or more, data output period of the plurality of display areas AR_1 to AR_n may be synchronized with a horizontal period, and in each, or one or more, output period, the on-slew rate of the output control signal SOUT_EN may increase according to an increase in a distance between the corresponding display area AR and the source drivers 30_1 to 30_*k* or may decrease according to a decrease in the distance.

Each, or one or more, of the plurality of buffers 61_1 to 61_*j* may receive the switch control signal SW_CON, and may operate according to each, or one or more, of the plurality of slope signals SLP_1 to SLP_j and each, or one or more, of the plurality of inverted slope signals SLPB_1 to SLPB_j to generate the output control signal SOUT_EN according to the switch control signal SW_CON. Respective driving abilities of the plurality of buffers 61_1 to 61_*j* may be different. The driving ability of the buffer is ability to change the output according to the input change, and as the driving ability increases, the delay period required, or sufficient, for the output to change according to the input change decreases. That is, as the driving ability increases, the slew rate of the buffer output increases. As current driving ability of a transistor configuring the buffer increases, driving ability of the buffer increases. Since the current driving ability of the transistor is determined by a size of the transistor, the size of the buffer may increase as the driving ability of the buffer increases.

The output control data OCD may include information on the type and number of buffers to be operated among the plurality of buffers 61_1 to 61_*j* according to a position of each, or one or more, of the plurality of display areas AR_1 to AR_n. The buffer control circuit 62 may generate the plurality of slope signals SLP_1 to SLP_j and the plurality of inverted slope signals SLPB_1 to SLPB_j for controlling the type and number of buffers to generate the output control signal SOUT_EN of an on-level (a high level) every output period according to the output control data OCD.

For better understanding and ease of description, when quantifying the driving abilities of the plurality of buffers 61_1 to 61_*j*, assuming that the lowest driving ability is 1, the current driving abilities of the plurality of buffers 61_1 to 61_*j* may be 1, 2, 4, 8, 16, . . . , and 20. In the plurality of buffers 61_1 to 61_*j* shown in FIG. 4, it is assumed that the driving ability increases in an order of the buffer 61_1 to the buffer 61_*j*. However, the above setting is for describing the example embodiments, and the present inventive concepts are not limited thereto, and the plurality of driving abilities of the plurality of buffers 61_1 to 61_*j* may be determined in other ways.

In order to output the plurality of data signals DS_1 to DS_m to the display area AR_1, the source control circuit 60 generates the output control signal SOUT_EN with the lowest slew rate. In this case, the buffer control circuit 62 may operate only the buffer 61_*j* having a driving ability of 2_*j* among the plurality of buffers 61_1 to 61_*j*.

In order to output the plurality of data signals DS_1 to DS_m to the display area AR_2, the source control circuit 60 generates the output control signal SOUT_EN with the second lowest slew rate. In this case, the buffer control circuit 62 may operate the buffer 61_1 having a driving ability of 1 and the buffer 61_*j* among the plurality of buffers 61_1 to 61_*j*.

In order to output the plurality of data signals DS_1 to DS_m to the display area AR_3, the source control circuit 60 generates the output control signal SOUT_EN with the third lowest slew rate. In this case, the buffer control circuit 62 may operate the buffer 61_2 having a driving ability of 2 and the buffer 61_*j* among the plurality of buffers 61_1 to 61_*j*.

In order to output the plurality of data signals DS_1 to DS_m to the display area AR_4, the source control circuit 60 generates the output control signal SOUT_EN with the fourth lowest slew rate. In this case, the buffer control circuit 62 may operate two buffers 61_1 and 61_2 having driving abilities of 1 and 2 and the buffer 61_*j* among the plurality of buffers 61_1 to 61_*j*.

When outputting the plurality of data signals DS_1 to DS_m to each, or one or more, of the remaining display areas AR5 to ARn in this way, the buffer control circuit 62 may change the type and number of buffers to be operated among the plurality of buffers 61_1 to 61_*j*. Finally, in order to output the plurality of data signals DS_1 to DS_m to the display area AR_n, the buffer control circuit 62 may operate all of the plurality of buffers 61_1 to 61_*j* to generate the output control signal SOUT_EN with the highest slew rate.

The buffer control circuit 62 may generate and supply a high-level slope signal SLP and a low-level inverted slope signal SLPB to a corresponding buffer in order to operate any of the plurality of buffers 61_1 to 61_*j*.

As shown in FIG. 4, the buffer 61_1 includes a transmission gate TG1 and/or three transistors TR1 to TR3. The transistor TR1 may be a pull-up transistor, and the transistor TR2 may be a pull-down transistor. In each, or one or more, of the plurality of buffers 61_1 to 61_*j*, there is only a difference in the current driving ability of complementary metal-oxide-semiconductor (CMOS) transistors (TR1 and TR2 in FIG. 4) connected to the output terminal, and components of each, or one or more, buffer and a connection relationship between the components may be the same as those of the buffer 61_1.

An n-channel type transistor and a p-channel type transistor are connected in parallel in the transmission gate TG1, and two control signals having inverted phases are respectively inputted to the gates of the respective transistors. A gate of the n-channel type transistor configuring the transmission gate TG1 may be a control terminal, and a gate of the p-channel type transistor may be an inverted control terminal. The inverted slope signal SLPB_1 may be inputted to an inverted control terminal of the transmission gate TG1, and the slope signal SLP_1 may be inputted to a control terminal of each, or one or more, transmission gate TG1. An input terminal of the transmission gate TG1 is connected to an input node N1 to which the switch control signal SW_CON is provided, and an output terminal of the transmission gate TG1 is connected to the gate of the transistor TR1. A power voltage VDD is provided to one terminal (a source) of the transistor TR3, the slope signal SLP_1 is inputted to the gate of the transistor TR3, and the other terminal (a drain) of the transistor TR3 is connected to the gate of the transistor TR1. The power voltage VDD is provided to one terminal (a source) of the transistor TR1, a power source voltage VSS is provided to one terminal (a source) of the transistor TR2, and the other terminal (a drain) of the transistor TR1 and the other terminal (a drain) of the transistor TR2 are connected to the output node N2.

When the buffer control circuit 62 operates the buffer 61_1 so as to increase the output control signal SOUT_EN, it may generate the slope signal SLP_1 of a high level and the inverted slope signal SLPB_1 of a low level to be supplied to the buffer 61_1. Then, the transmission gate TG1 is turned on, so that the switch control signal SW_CON is inputted to the gates of the transistors TR1 and TR2. When the switch control signal SW_CON is at a low level, the transistor TR1 is turned on and the transistor TR2 is turned off, so that the output control signal SOUT_EN may be pulled up by the transistor TR1 to be at a high level.

When the output control signal SOUT_EN falls, all, or one or more, of the plurality of buffers 61_1 to **61_*j* operate. In the plurality of buffers 61_1 to 61_*j***, when the switch control signal SW_CON is at a high level, the transistor TR2 is turned on and the transistor TR1 is turned off, so that the output control signal SOUT_EN may be pulled down by the transistor TR2 to be at a low level.

Hereinafter, a driving method of a display device according to some example embodiments will be described.

Figure 5:
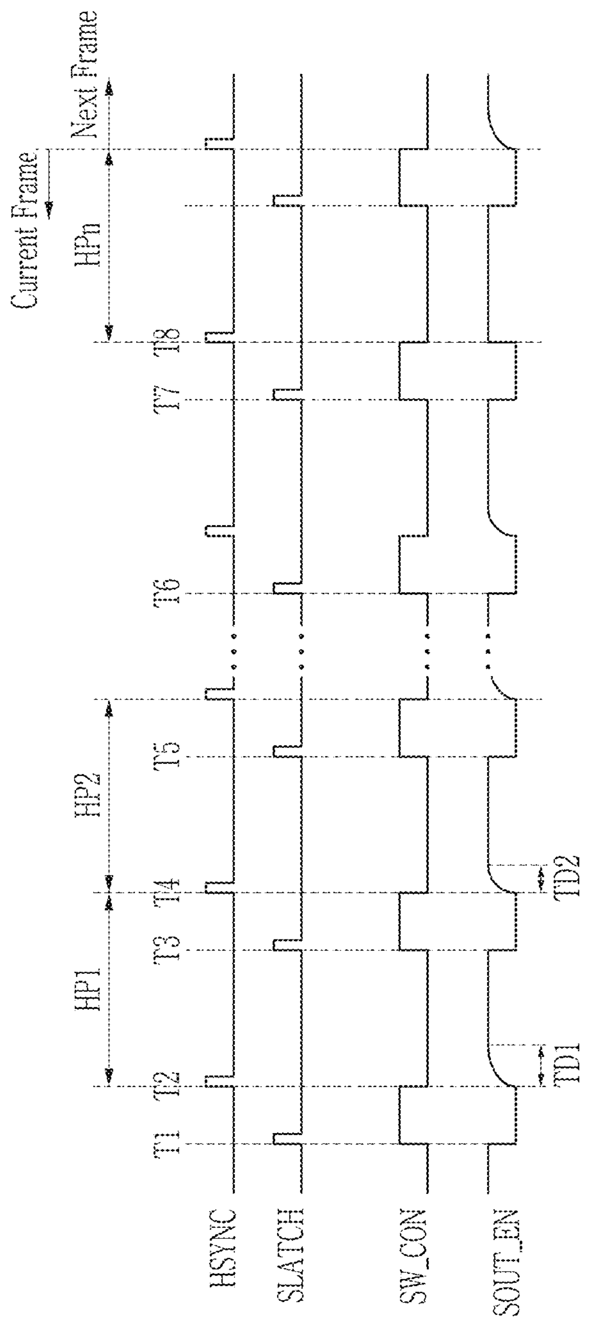
FIG. 5 illustrates a waveform diagram of waveforms of a horizontal synchronization signal, a latch signal, a switch control signal, and an output control signal according to some example embodiments.

FIG. 5 illustrates a waveform diagram of waveforms of a horizontal synchronization signal, a latch signal, a switch control signal, and an output control signal according to some example embodiments.

FIG. 5 illustrates a waveform of the output control signal SOUT_EN corresponding to each of the plurality of display areas AR_1 to AR_n for each horizontal period. As illustrated in FIG. 5, an on-pulse of a horizontal synchronization signal HSYNC may occur every horizontal period. A latch signal SLATCH includes an on-pulse that controls the shift register 33 to transmit the pixel data of one pixel row stored in the shift register 33 to the level shifter 34. The timing controller 20 may provide the latch signal SLATCH to the plurality of source drivers 20. The latch signal SLATCH may have the same period as the horizontal period, and may have a predetermined (or alternately given) phase difference from the horizontal synchronization signal Hsync. However, the configuration and method for generating the latch signal SLATCH are not limited to this description.

When the pixel data of the next pixel row is transmitted from the shift register 33 to the level shifter 34 in synchronization with the on-pulse of the latch signal SLATCH, the plurality of data signals DS_1 to DS_m corresponding to the current pixel row may be changed by the pixel data of the next pixel row. To reduce, or prevent, this, the switch control signal SW_CON may be changed to a level (for example, a high level) for turning off the plurality of output switches 37_1 to **37_*m* at every rising edge time point of the latch signal SLATCH. A waveform of the switch control signal SW_CON may be different from that of FIG. 5. For example, the switch control signal SW_CON may have a phase inverted from the waveform shown in FIG. 5**.

When the switch control signal SW_CON becomes at a high level, the pull-down transistors (TR2 in FIG. 4) of the plurality of buffers 61_1 to **61_*j* may be turned on, while the pull-up transistors (TR1 in FIG. 4) thereof may be turned off. Accordingly, the output control signal SOUT_EN falls to a low level in synchronization with rising edge time points T1, T3, T5, T6, and T7** of the switch control signal SW_CON in every horizontal period.

At the time point T2 of a horizontal period HP1, the switch control signal SW_CON may be at a low level in synchronization with the on-pulse of the horizontal synchronization signal HSYNC. Since the display area AR_1 is a display area closest to the plurality of source drivers 30_1 to **30_*k*, the on-slew rate of the output control signal SOUT_EN is the lowest. Accordingly, only the minimum number of buffers among the plurality of buffers 61_1 to 61_*j* may operate. For example, the buffer control circuit 62 may generate the plurality of slope signals SLP_1 to SLP_j−1 with a low level, and may generate the plurality of inverted slope signals SLPB_1 to SLPB_j−1 with a high level, and it may generate the slope signal SLP_j with a high level, and may generate the inverted slope signal SLPB_j with a low level. Then, only the buffer 61_*j* operates for the rising of the output control signal SOUT_EN. At the time point T2, the switch control signal SW_CON becomes at a low level, so that the pull-up transistor TR1 of the buffer 61_*j* may be turned on, while the pull-down transistor TR2 thereof may be turned off. Accordingly, the output control signal SOUT_EN rises to an on-slew rate according to the driving ability of the buffer 61_*j* from the time point T2**.

Then, at the time point T4 in a horizontal period HP2, the switch control signal SW_CON may be at a low level in synchronization with the on-pulse of the horizontal synchronization signal HSYNC. Since the display area AR_2 is a display area that is at the second closest distance to the plurality of source drivers 30_1 to **30_*k*, the buffer control circuit 62 may control the plurality of buffers 61_1 to 61_*j* such that the on-slew rate of the output control signal SOUT_EN is at the second lowest. For example, the buffer control circuit 62 may generate the plurality of slope signals SLP_2 to SLP_j−1 with a low level, and may generate the plurality of inverted slope signals SLPB_2 to SLPB_j−1 with a high level, and it may generate the slope signals SLP_1 and SLP_j with a high level, and may generate the inverted slope signals SLPB_1 and SLPB_j with a low level. Then, the two buffers 61_1 and 61_*j* operate for the rising of the output control signal SOUT_EN. At the time point T4, by the switch control signal SW_CON, the pull-up transistors of the buffers 61_1 and 61_*j* may be turned on, while the pull-down transistors thereof may be turned off. Accordingly, the output control signal SOUT_EN rises to an on-slew rate according to the driving ability of the buffers 61_1 and 61_*j* from the time point T4**.

As shown in FIG. 5, as a display area among the plurality of display areas AR_1 to AR_n moves away from the plurality of source drivers 30_1 to **30_*k*, the on-slew rate of the output control signal SOUT_EN increases. The switch control signal SW_CON may be at a low level in synchronization with the on-pulse of the horizontal synchronization signal HSYNC at a time point T8 in the last horizontal period HPn of one frame. Since the display area AR_n is a display area that is at the farthest distance from the plurality of source drivers 30_1 to 30_*k*, the buffer control circuit 62 may control the plurality of buffers 61_1 to 61_*j* such that the on-slew rate of the output control signal SOUT_EN is at the highest. For example, the buffer control circuit 62 may generate the plurality of slope signals SLP_1 to SLP_j to be at a high level, and may generate the plurality of inverted slope signals SLPB_1 to SLPB_j to be at a low level. Then, the plurality of buffers 61_1 to 61_*j* are operated for the rising of the output control signal SOUT_EN. At the time point T8, by the switch control signal SW_CON, the pull-up transistors of the buffers 61_1 to 61_*j* may be turned on, while the pull-down transistors thereof may be turned off. Accordingly, the output control signal SOUT_EN rises to an on-slew rate according to the driving ability of the buffers 61_1 to 61_*j* from the time point T8**.

In the next frame, the output control signal SOUT_EN may be controlled in the same manner as in the current frame.

As shown in FIG. 5, a delay period required, or sufficient, for the output control signal SOUT_EN to rise to the on-level based on the on-pulse time point of the horizontal synchronization signal HSYNC may vary depending on a position of the display area. As shown in FIG. 5, the time point T2 at which the horizontal synchronization signal HSYNC rises to the on-level pulse is a starting time point of the horizontal period HP1 for the display area AR1, and the time point T4 is the starting time point of the horizontal period HP2 for the display area AR2. A delay period TD1 from the time point T2 to a time at which the output control signal SOUT_EN becomes the on-level is longer than a delay period TD2 from the time point T4 to a time point at which the output control signal SOUT_EN becomes the on-level.

In some example embodiments shown in FIG. 3, the plurality of source drivers 30_1 to **30_*k* may be positioned to be adjacent to the gate line GL_1 of the display panel 10, that is, may be positioned at an upper end of the display panel 10. However, the present inventive concepts are not limited thereto, and the plurality of source drivers 30_1 to 30_*k* may be positioned to be adjacent to the gate line GL_n of the display panel 10, that is, may be positioned at a lower end of the display panel 10. In this case, a load (distance) between each, or one or more, of the plurality of source drivers 30_1 to 30_*k* and each, or one or more, of the plurality of display areas AR_1 to AR_n may have a tendency opposite to that of the example embodiments of FIG. 3**.

Figure 6:
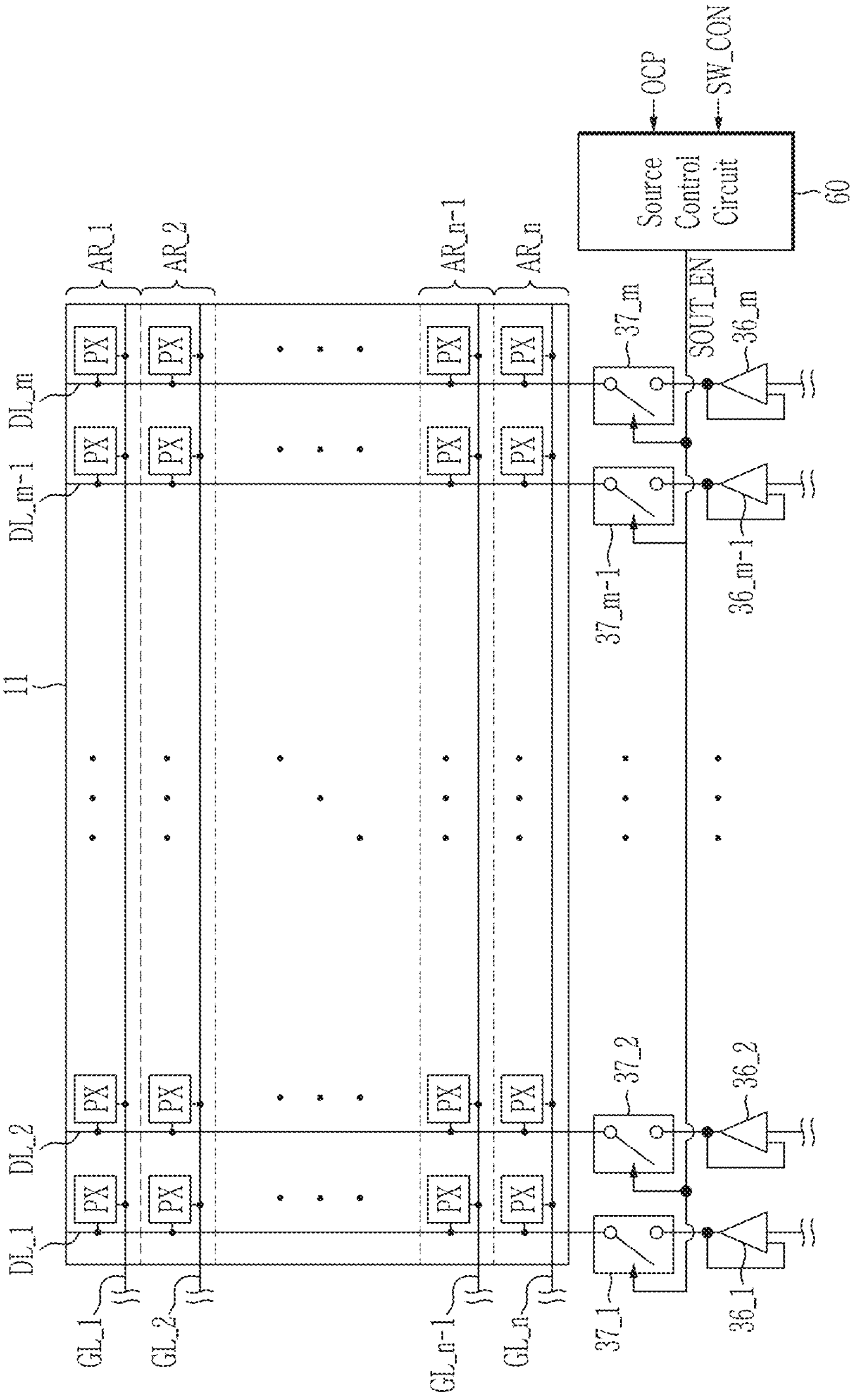
FIG. 6 illustrates a display panel divided into a plurality of areas and a plurality of output switches connected to a plurality of data lines, according to some example embodiments.

FIG. 6 illustrates a display panel divided into a plurality of areas and a plurality of output switches connected to a plurality of data lines, according to some example embodiments.

In FIG. 6, unlike the example embodiments shown in FIG. 3, the plurality of output switches 37_1 to **37_*m* connected to the plurality of data lines DL_1 to DL_m are illustrated when the plurality of source drivers 30_1 to 30_*k* are positioned to be adjacent to the gate line GL_n of the display panel 10. Compared to FIG. 3, only positions of the plurality of output switches 37_1 to 37_*m* connected to the plurality of data lines DL_1** to DL_m are different, but a circuit configuration thereof may be the same.

In the example embodiments shown in FIG. 6, among the plurality of display areas AR_1 to AR_n, the display area AR_1 is furthest from the plurality of source drivers 30_1 to **30_*k***, while the display area AR_n is closest to them. Accordingly, the on-slew rate of the output control signal SOUT_EN may be the highest in the first horizontal period of one frame and the lowest in the last horizontal period of one frame. From the first horizontal period to the last horizontal period, the on-slew rate may gradually decrease.

Figure 7:
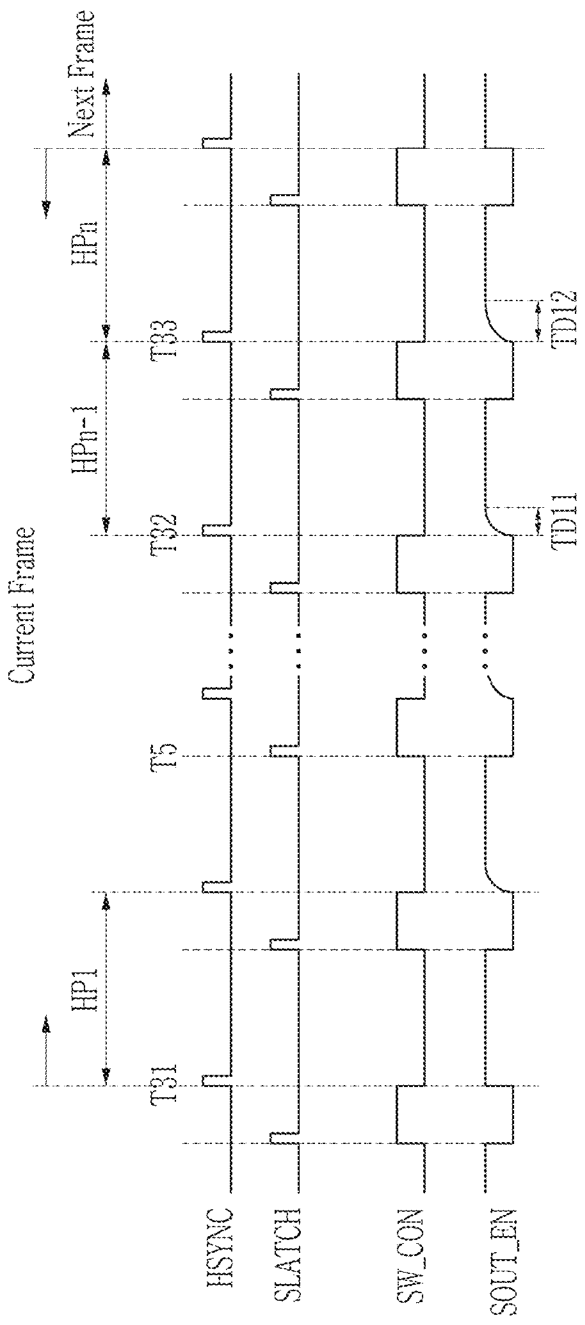
FIG. 7 illustrates a waveform diagram of waveforms of a horizontal synchronization signal, a latch signal, a switch control signal, and an output control signal according to some example embodiments.

In the description of the example embodiments of FIG. 7, a description overlapping with the description of FIG. 5 will be omitted.

At a time point T31 of the horizontal period HP1 of the current frame, the switch control signal SW_CON may be at a low level in synchronization with the on-pulse of the horizontal synchronization signal HSYNC. Since the display area AR_1 is a display area that is at the farthest distance from the plurality of source drivers 30_1 to **30_*k*, the buffer control circuit 62 may control the plurality of buffers 61_1 to 61_*j* such that the on-slew rate of the output control signal SOUT_EN is at the highest. Accordingly, the output control signal SOUT_EN rises to an on-slew rate according to the driving ability of the buffers 61_1 to 61_*j* from the time point T31**. From the next horizontal period to the last horizontal period, the on-slew rate may gradually decrease.

At a time point T32 of a horizontal period HPn−1, the switch control signal SW_CON may be at a low level in synchronization with the on-pulse of the horizontal synchronization signal HSYNC. Since a display area AR_n−1 is a display area that is at the second closest distance to the plurality of source drivers 30_1 to **30_*k*, the buffer control circuit 62 may control the plurality of buffers 61_1 to 61_*j* such that the on-slew rate of the output control signal SOUT_EN is at the second lowest. Accordingly, the output control signal SOUT_EN may rise during a delay period TD11 at the second lowest on-slew rate from the time point T32**.

At a time point T33 of a horizontal period HPn, the switch control signal SW_CON may be at a low level in synchronization with the on-pulse of the horizontal synchronization signal HSYNC. Since the display area AR_n is a display area that is at the closest distance to the plurality of source drivers 30_1 to **30_*k*, the buffer control circuit 62 may control the plurality of buffers 61_1 to 61_*j* such that the on-slew rate of the output control signal SOUT_EN is at the lowest. Accordingly, the output control signal SOUT_EN may rise during a delay period TD12 at the lowest on-slew rate from the time point T33**.

As the number of channels of a high resolution (FHD/WQHD+or higher) display device increases, an electromagnetic interference (EMI) characteristic of the source driver may deteriorate. As the amplifier driving ability of the source driver increases for high-resolution driving, the EMI characteristic may further deteriorate. As the EMI characteristic deteriorates, it is difficult to normally perform signal transmission and reception in an environment with high IC integration inside a DDI module. The EMI characteristic may be improved by distributing the on period of the output control signal for each, or one or more, channel within one pixel row or by adjusting the slope of the output control signal. However, when this method is equally applied in one frame, since the load of the source driver is not considered, the effect of improving the EMI characteristic may not be provided. According to some example embodiments, when the on-slew rate of the output control signal is controlled, a delay period for generating a dynamic current for each, or one or more, of the plurality of display areas varies. A dynamic current generation time point is divided within one frame for each, or one or more, of the plurality of display areas, and an EMI baseband is lowered within one frame, so that the EMI characteristic may be improved. Therefore, display of an image on a display device may be improved by controlling the on-slew rate of the output control signal according to example embodiments.

In some example embodiments described above, although it has been described that the plurality of driving abilities (buffer sizes) of the plurality of buffers 61_1 to **61_*j* are different, the present inventive concepts are not limited thereto, and they may be determined in other ways. For example, the driving abilities of the plurality of buffers 61_1 to 61_*j*** are the same, and the on-slew rate of the output control signal SOUT_EN may be controlled by controlling the number of buffers operating for each, or one or more, of the plurality of display areas AR_1 to AR_n. In this case, according to the control of the source control circuit 60, Nr (Nr is an integer greater than or equal to 1) buffers among the plurality of buffers 61_1 to 61_j may operate to generate the output control signal SOUT_EN for the display area AR_1, Nr+dr1 (dr1 is an integer greater than or equal to 1) buffers may operate to generate the output control signal SOUT_EN for the display area AR_2, Nr+dr2 (dr2 is an integer greater than dr1) buffers may operate to generate the output control signal SOUT_EN for the display area AR_3, and all of the plurality of buffers 61_1 to 61_j may operate to generate the output control signal SOUT_EN for the display area AR_n. As described above, as a distance between the plurality of source drivers 30_1 to 30_k and a predetermined (or alternately given) display area increases, the number of operating buffers may increase.

In some example embodiments, the on-slew rate of the output control signal SOUT_EN is controlled for each, or one or more, of the plurality of display areas AR_1 to AR_n. The present inventive concepts are not limited thereto, and the off-slew rate may be controlled together with the on-slew rate of the output control signal SOUT_EN.

Figure 8:
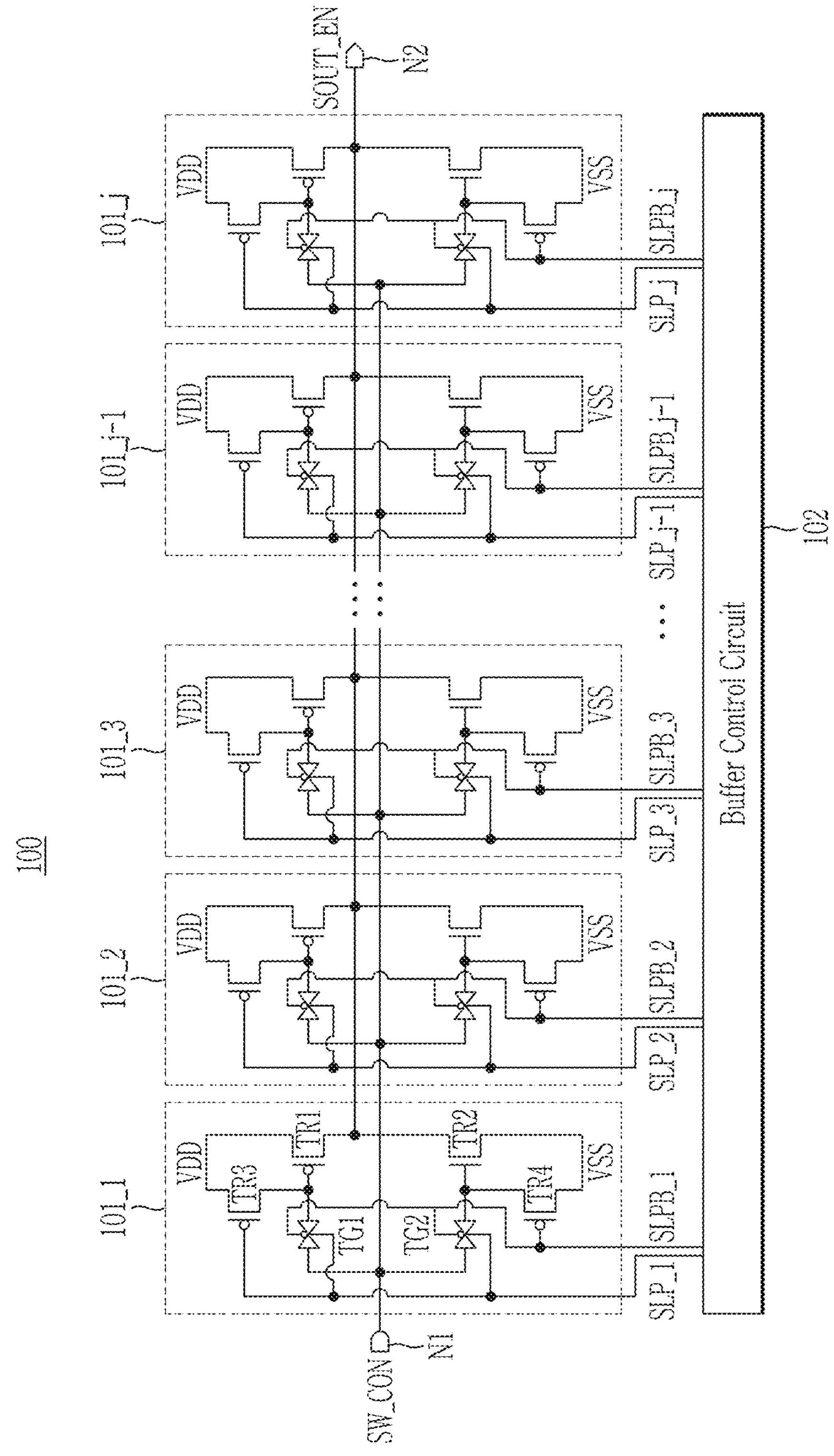
FIG. 8 illustrates a circuit diagram of a source control circuit according to some example embodiments.

FIG. 8 illustrates a circuit diagram of a source control circuit according to some example embodiments.

Among a plurality of configurations of a source control circuit 100 shown in FIG. 8, the same reference numerals are used to indicate the same configurations as those of the source control circuit 60 shown in FIG. 4.

As shown in FIG. 8, the source control circuit 100 may include a plurality of buffers 101_1 to 101_j and/or a buffer control circuit 102. The buffer control circuit 102 may have the same configuration as the buffer control circuit 62 described above.

The plurality of buffers 101_1 to 101_j shown in FIG. 8 may adjust the on-slew rate as well as the off-slew rate of the output control signal SOUT_EN. Specifically, the on-level of the output control signal SOUT_EN may be a high level, and the on-slew rate may be a rising slew rate of the output control signal SOUT_EN, and the off-level of the output control signal SOUT_EN may be a low level, and the off-slew rate may be a falling slew rate of the output control signal SOUT_EN. The source control circuit 100 shown in FIG. 8 may change the on-slew rate and the off-slew rate of the output control signal SOUT_EN every output period.

Each, or one or more, of the plurality of buffers 101_1 to 101_j may receive the switch control signal SW_CON, and may operate according to each, or one or more, of the plurality of slope signals SLP_1 to SLP_j and each, or one or more, of the plurality of inverted slope signals SLPB_1 to SLPB_j to generate the output control signal SOUT_EN according to the switch control signal SW_CON. Respective driving abilities of the plurality of buffers 101_1 to 101_j may be different.

The buffer control circuit 102 may generate the plurality of slope signals SLP_1 to SLP_j and the plurality of inverted slope signals SLPB_1 to SLPB_j for controlling the type and number of buffers to generate the output control signal SOUT_EN of an on-level (a high level) and an off-level (a low level) every output period according to the output control data OCD.

In the plurality of buffers 101_1 to 101_j shown in FIG. 8, it is assumed that the driving abilities increase to 1, 2, 4, 8, 16, . . . , and $2^{j-1}$ in the order from the buffer 101_1 to the buffer 101_j. However, the above setting is for describing some example embodiments, and the present inventive concepts are not limited thereto, and the plurality of driving abilities of the plurality of buffers 101_1 to 101_j may be determined in other ways.

In order to output the plurality of data signals DS_1 to DS_m to the display area AR_1, the source control circuit 100 generates the output control signal SOUT_EN with the lowest slew rate. In this case, the buffer control circuit 102 may operate only the buffer 101_j having a driving ability of $2^{j-1}$ among the plurality of buffers 101_1 to 101_j.

In order to output the plurality of data signals DS_1 to DS_m to the display area AR_1, the source control circuit 100 generates the output control signal SOUT_EN with the second lowest slew rate. In this case, the buffer control circuit 102 may operate the buffer 101_1 having a driving ability of 1 and the buffer 101_j among the plurality of buffers 101_1 to 101_j.

In order to output the plurality of data signals DS_1 to DS_m to the display area AR_3, the source control circuit 100 generates the output control signal SOUT_EN with the third lowest slew rate. In this case, the buffer control circuit 102 may operate the buffer 101_2 having a driving ability of 2 and the buffer 101_j among the plurality of buffers 101_1 to 101_j.

In order to output the plurality of data signals DS_1 to DS_m to the display area AR_4, the source control circuit 100 generates the output control signal SOUT_EN with the fourth lowest slew rate. In this case, the buffer control circuit 102 may operate two buffers 101_1 and 1012 having driving abilities of 1 and 2 and the buffer 101_j among the plurality of buffers 101_1 to 101_j.

When outputting the plurality of data signals DS_1 to DS_m to each, or one or more, of the remaining display areas AR5 to ARn in this way, the buffer control circuit 102 may change the type and number of buffers to be operated among the plurality of buffers 101_1 to 101_j. Finally, in order to output the plurality of data signals DS_1 to DS_m to the display area AR_n, the buffer control circuit 102 may operate all of the plurality of buffers 101_1 to 101_j to generate the output control signal SOUT_EN with the highest slew rate.

The buffer control circuit 102 may generate and supply a high-level slope signal SLP and a low-level inverted slope signal SLPB to a corresponding buffer in order to operate any of the plurality of buffers 101_1 to 101_j.

As shown in FIG. 8, the buffer 101_1 includes two transmission gates TG1 and TG2, and/or four transistors TR1 to TR4. The transistor TR1 may be a pull-up transistor, and the transistor TR2 may be a pull-down transistor. In each, or one or more, of the plurality of buffers 101_1 to 101_j, there is only a difference in the current driving ability of complementary metal-oxide-semiconductor (CMOS) transistors (TR1 and TR2 in FIG. 8) connected to the output terminal, and components of each, or one or more, buffer and a connection relationship between the components may be the same as those of the buffer 101_1. A detailed configuration of the transmission gate TG2 may be the same as that of the transmission gate TG1.

The inverted slope signal SLPB_1 may be inputted to an inverted control terminal of each, or one or more, of the transmission gates TG1 and TG2, and the slope signal SLP_1 may be inputted to a control terminal of each, or one or more, of the transmission gate TG1 and TG2. The input terminals of the transmission gates TG1 and TG2 are connected to the input node N1 to which the switch control signal SW_CON is provided, the output terminal of the transmission gate TG1 is connected to the gate of the transistor TR1, and the output terminal of the transmission gate TG2 is connected to the gate of transistor TR2. The power voltage VDD is provided to one terminal (a source) of the transistor TR3, the slope signal SLP_1 is inputted to the gate of the transistor TR3, and the other terminal (a drain) of the transistor TR3 is connected to the gate of the transistor TR1. The power voltage VSS is provided to one terminal (a source) of the transistor TR4, the inverted slope signal SLPB_1 is inputted to the gate of the transistor TR4, and the other terminal (a drain) of the transistor TR4 is connected to the gate of the transistor TR2. The power voltage VDD is provided to one terminal (a source) of the transistor TR1, the power source voltage VSS is provided to one terminal (a source) of the transistor TR2, and the other terminal (a drain) of the transistor TR1 and the other terminal (a drain) of the transistor TR2 are connected to the output node N2.

When the buffer control circuit 102 operates the buffer 101_1 so as to increase the output control signal SOUT_EN, it may generate the slope signal SLP_1 of a high level and the inverted slope signal SLPB_1 of a low level to be supplied to the buffer 101_1. Then, the transmission gates TG1 and TG2 are turned on, and the transistors TR3 and TR4 are turned off, so that the switch control signal SW_CON is inputted to the gates of the transistors TR1 and TR2. When the switch control signal SW_CON is at a low level, the transistor TR1 is turned on and the transistor TR2 is turned off, so that the output control signal SOUT_EN may be pulled up by the transistor TR1 to be at a high level. When the switch control signal SW_CON is at a high level, the transistor TR1 is turned off and the transistor TR2 is turned on, so that the output control signal SOUT_EN may be pulled down by the transistor TR2 to be at a low level.

Hereinafter, a driving method of a display according to some example embodiments will be described.

Figure 9:
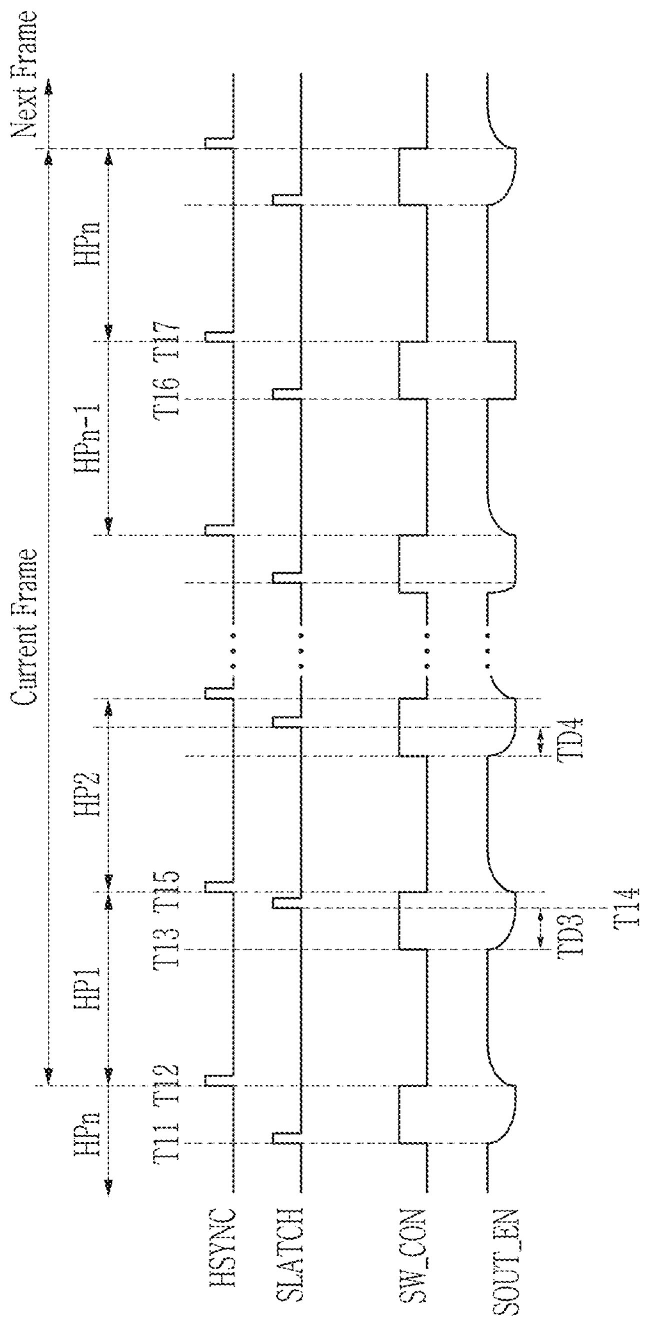
FIG. 9 illustrates a waveform diagram of waveforms of a horizontal synchronization signal, a latch signal, a switch control signal, and an output control signal according to some example embodiments.

FIG. 9 illustrates a waveform diagram of waveforms of a horizontal synchronization signal, a latch signal, a switch control signal, and an output control signal according to some example embodiments.

FIG. 9 illustrates a waveform of the output control signal SOUT_EN corresponding to each, or one or more, of the plurality of display areas AR_1 to AR_n for each, or one or more, horizontal period. As illustrated in FIG. 9, an on-pulse of the horizontal synchronization signal HSYNC may occur every horizontal period.

The source control circuit 100 may receive the latch signal SLATCH from the timing controller 20, and may differently control an on-pulse delay period, which is a period from an arbitrary reference time point to a time point at which the on-pulse of the latch signal SLATCH occurs, for each, or one or more, of the plurality of display areas AR_1 to AR_n. The arbitrary reference time point may be a rising edge of the switch control signal SW_CON. For example, the source control circuit 100 may control the on-pulse delay period based on the rising edge of the switch control signal SW_CON for each, or one or more, of the plurality of display areas AR_1 to AR_n, according to a distance between the plurality of source drivers 30_1 to 30_*k*. That is, as a distance between a predetermined (or alternately given) display area among the plurality of display areas AR_1 to AR_n and the plurality of source drivers 30_1 to 30_*k* decreases, the source control circuit 100 may increase the on-pulse delay period of the latch signal SLATCH for the corresponding display area. Through this, the source control circuit 100 may control the latch signal SLATCH to generate the on-pulse of the latch signal SLATCH after the output control signal SOUT_EN decreases to a low level that is an off-level. However, the configuration and method for generating the latch signal SLATCH are not limited to this description. When the on-pulse of the latch signal SLATCH occurs before the output control signal SOUT_EN becomes at the off-level, while the plurality of data signals DS_1 to DS_m of the current horizontal period are supplied to the display area (for example, AR3), the plurality of data signals DS_1 to DS_m of the next horizontal period may affect the plurality of data signals DS_1 to DS_m of the current horizontal period. Then, an image of the display area AR_3 is affected by an image of the display area AR_4, so that image quality deterioration may occur.

During the horizontal period HPn of the previous frame, the switch control signal SW_CON becomes at a high level at a time point T11, and the plurality of data signals DS_1 to DS_m are supplied to the display area AR_1 in the next horizontal period HP1 based on the time point T11. Since the display area AR_1 is a display area closest to the plurality of source drivers 30_1 to 30_*k*, it has the lowest on-slew rate and off-slew rate. Accordingly, only the minimum number of buffers among the plurality of buffers 101_1 to 101_*j* may operate. For example, the buffer control circuit 62 may generate the plurality of slope signals SLP_1 to SLP_j−1 with a low level, and may generate the plurality of inverted slope signals SLPB_1 to SLPB_j−1 with a high level, and it may generate the slope signal SLP_j with a high level, and may generate the inverted slope signal SLPB_j with a low level. Then, only the buffer 101_*j* operates for the falling and rising of the output control signal SOUT_EN. At the time point T11, by the switch control signal SW_CON, the pull-down transistor TR2 of the buffer 101_*j* may be turned on, while the pull-up transistor TR1 thereof may be turned off. Accordingly, the output control signal SOUT_EN falls to an off-slew rate according to the driving ability of the buffer 101_*j* from the time point T11. The on-pulse of the latch signal SLATCH occurs at a time point T12 at which the output control signal SOUT_EN decreases to the off-level. At the time point T12, the switch control signal SW_CON may become at a high level in synchronization with the on-pulse of the horizontal synchronization signal HSYNC. At the time point T12, by the switch control signal SW_CON, the pull-up transistor TR1 of the buffer 101_*j* may be turned on, while the pull-down transistor TR1 thereof may be turned off. Accordingly, the output control signal SOUT_EN rises to an on-slew rate according to the driving ability of the buffer 101_*j* from the time point T12.

During the horizontal period HP1, the switch control signal SW_CON becomes at a high level at a time point T13, and the plurality of data signals DS_1 to DS_m are supplied to the display area AR_2 in the next horizontal period HP2 based on the time point T13. Since the display area AR_2 is a display area that is at the second closest distance to the plurality of source drivers 30_1 to 30_*k*, the buffer control circuit 102 may control the plurality of buffers 101_1 to 101_*j* such that the on-slew rate and the off-slew rate are at the second lowest. For example, the buffer control circuit 102 may generate the plurality of slope signals SLP_2 to SLP_j−1 with a low level, and may generate the plurality of inverted slope signals SLPB_2 to SLPB_j−1 with a high level, and it may generate the slope signals SLP_1 and SLP_j with a high level, and may generate the inverted slope signals SLPB_1 and SLPB_j with a low level. Then, the two buffers 101_1 and 101_*j* operate for the falling and the rising of the output control signal SOUT_EN. At the time point T13, by the switch control signal SW_CON, the pull-down transistors TR2 of the buffers 101_1 and 101_*j* may be turned on, while the pull-up transistors TR1 thereof may be turned off. Accordingly, the output control signal SOUT_EN falls to an off-slew rate according to the driving ability of the buffers 101_1 to 101_*j* from the time point T13. The on-pulse of the latch signal SLATCH occurs after a time point T14 at which the output control signal SOUT_EN decreases to the off-level. At a time point T15, the switch control signal SW_CON may become at a high level in synchronization with the on-pulse of the horizontal synchronization signal HSYNC. At the time point T15, by the switch control signal SW_CON, the pull-down transistors TR1 of the buffers 101_1 and 101_*j* may be turned on, while the pull-up transistors TR2 thereof may be turned off. Accordingly, the output control signal SOUT_EN rises to an on-slew rate according to the driving ability of the buffers 101_1 to 101_*j* from the time point T15.

As shown in FIG. 9, as a predetermined (or alternately given) display area among the plurality of display areas AR_1 to AR_n moves away from the plurality of source drivers 30_1 to 30_*k*, the on-slew rate and the off-slew rate of the output control signal SOUT_EN increase. During the horizontal period HPn−1, the switch control signal SW_CON becomes at a high level at a time point T16, and the plurality of data signals DS_1 to DS_m are supplied to the display area AR_n in the next horizontal period HPn based on the time point T16. Since the display area AR_n is a display area that is at the farthest distance from the plurality of source drivers 30_1 to 30_*k*, the buffer control circuit 102 may control the plurality of buffers 101_1 to 101_*j* such that the on-slew rate of the output control signal SOUT_EN are at the highest. For example, the buffer control circuit 102 may generate the plurality of slope signals SLP_1 to SLP_j to be at a high level, and may generate the plurality of inverted slope signals SLPB_1 to SLPB_j to be at a low level. Then, the plurality of buffers 101_1 to 101_*j* are all operated for rising and falling of the output control signal SOUT_EN. At the time point T16, by the switch control signal SW_CON, the pull-down transistors TR2 of the buffers 101_1 to 101_*j* may be turned on, while the pull-up transistors TR1 thereof may be turned off. Accordingly, the output control signal SOUT_EN may decrease to the maximum off-slew rate at the time point T16. Substantially, the output control signal SOUT_EN may immediately fall to the off-level at the time point T16. The on-pulse of the latch signal SLATCH occurs after the time point T16 at which the output control signal SOUT_EN falls to the off-level. At a time point T17, the switch control signal SW_CON may become at a high level in synchronization with the on-pulse of the horizontal synchronization signal HSYNC. At the time point T17, by the switch control signal SW_CON, the pull-up transistors TR1 of the buffers 101_1 to 101_*j* may be turned on, while the pull-down transistors TR2 thereof may be turned off. Accordingly, the output control signal SOUT_EN may increase to the maximum on-slew rate at the time point T17. Substantially, the output control signal SOUT_EN may immediately rise to the on-level at the time point T17.

Even in the next frame, the output control signal SOUT_EN may be controlled in the same manner as in the current frame.

As shown in FIG. 9, in the horizontal period, the delay period required, or sufficient, for the output control signal SOUT_EN to fall to the off-level may vary depending on the position of the display area. As shown in FIG. 9, a delay period TD3 in which the output control signal SOUT_EN is at the off-level in the horizontal period HP1 is longer than a delay period TD4 in which the output control signal SOUT_EN is at the off-level in the horizontal period HP2.

As described above, when the off-slew rate and the on-slew rate of the output control signal are also controlled, the delay period may vary at the start and end time points of the dynamic current generation period for each, or one or more, of the plurality of display areas. Dynamic current generation and finishing time points are divided within one frame for each, or one or more, of the plurality of display areas, and an EMI baseband is further lowered within one frame, so that the effect of improving the EMI characteristic may be increased.

In some example embodiments regarding the on-slew rate and off-slew rate control, although it has been described that the plurality of driving abilities (buffer sizes) of the plurality of buffers 101_1 to 101_*j* are different, the present inventive concepts are not limited thereto, and they may be determined in other ways. For example, the driving abilities of the plurality of buffers 101_1 to 101_*j* are the same, and the on-slew rate of the output control signal SOUT_EN may be controlled by controlling the number of buffers operating for each, or one or more, of the plurality of display areas AR_1 to AR_n. In this case, according to the control of the source control circuit 100, Nr (Nr is an integer greater than or equal to 1) buffers among the plurality of buffers 101_1 to 101_*j* may operate to generate the output control signal SOUT_EN for the display area AR_1, Nr+dr1 (dr1 is an integer greater than or equal to 1) buffers may operate to generate the output control signal SOUT_EN for the display area AR_2, Nr+dr2 (dr2 is an integer greater than dr1) buffers may operate to generate the output control signal SOUT_EN for the display area AR_3, and all of the plurality of buffers 61_1 to 61_*j* may operate to generate the output control signal SOUT_EN for the display area AR_n. As described above, as a distance between the plurality of source drivers 30_1 to 30_*k* and a predetermined (or alternately given) display area increases, the number of operating buffers may increase.

Figure 10:
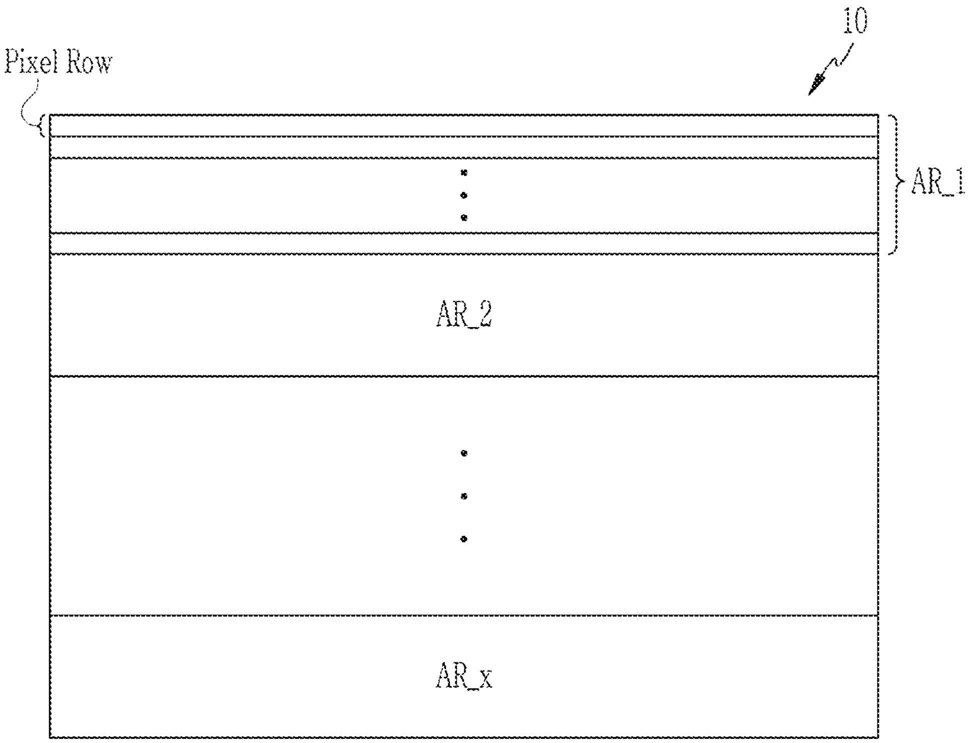
FIG. 10 schematically illustrates a plurality of display areas according to some example embodiments.

FIG. 10 schematically illustrates a plurality of display areas according to some example embodiments.

As shown in FIG. 10, each, or one or more, of a plurality of display areas AR1 to ARx may be defined by Na (Na is an integer greater than or equal to 2) pixel rows. In this case, the on-slew rate or the on-slew rate and the off-slew rate of the output control signal SOUT_EN during Na horizontal periods in which the plurality of data signals DS_1 to DS_m are provided to each, or one or more, of the plurality of display areas AR1 to ARx may be the same. In the order from the display area AR_1 to the display area ARx shown in FIG. 10, positions thereof may be far from the plurality of source drivers 30_1 to 30_*k*.

Figure 11:
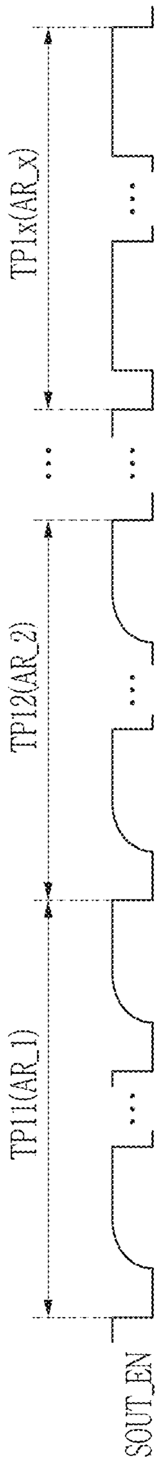
FIG. 11 illustrates a waveform diagram of a waveform of an output control signal according to some example embodiments.

FIG. 11 illustrates a waveform diagram of a waveform of an output control signal according to some example embodiments.

As shown in FIG. 11, on-slew rates of output control signals SOUT_EN for Na pixel rows of the display area AR_1 during a period TP1 may be the same. During the period TP1, the on-slew rate of the output control signal SOUT_EN may be the lowest. Next, the on-slew rates of the output control signals SOUT_EN for the Na pixel rows of the display area AR_2 during a period TP2 may be the same. During the period TP2, the on-slew rate of the output control signal SOUT_EN may be the second lowest. During a period TPx, the on-slew rates of the output control signals SOUT_EN for the Na pixel rows of the display area AR_x may also be the same. During the period TPx, the on-slew rate of the output control signal SOUT_EN is the highest.

Figure 12:
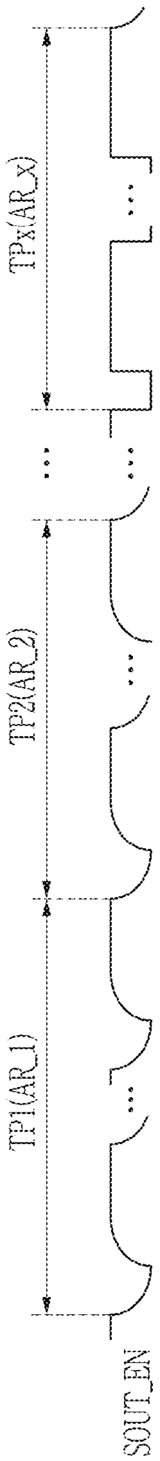
FIG. 12 illustrates a waveform diagram of a waveform of an output control signal according to some example embodiments.

FIG. 12 illustrates a waveform diagram of a waveform of an output control signal according to some example embodiments.

As shown in FIG. 12, the on-slew rates and the off-slew rates of the output control signals SOUT_EN for the Na pixel rows of the display area AR_1 during a period TP11 may be the same. During the period TP11, the on-slew rate and the off-slew rate of the output control signal SOUT_EN may be the lowest. Next, the on-slew rates and the off-slew rates of the output control signals SOUT_EN for the Na pixel rows of the display area AR_2 during a period TP12 may be the same. During the period TP12, the on-slew rate and the off-slew rate of the output control signal SOUT_EN may be the second lowest. During a period TP1_x_, the on-slew rates and the off-slew rates of the output control signals SOUT_EN for the Na pixel rows of the display area AR_x may also be the same. During the period TP1_x_, the on-slew rate and the off-slew rate of the output control signal SOUT_EN is the highest.

The plurality of output switches 37_1 to 37_*m* according to some example embodiments may be implemented as a transmission gate.

Figure 13:
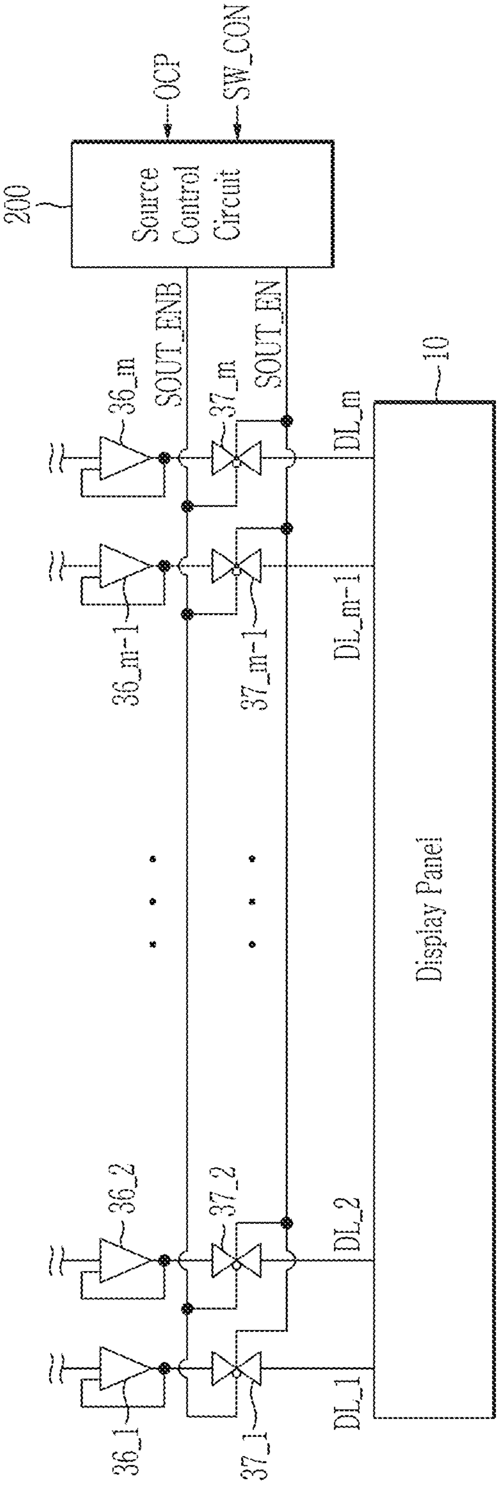
FIG. 13 illustrates a circuit diagram of a display including a plurality of output switches implemented as a transmission gate according to some example embodiments.

FIG. 13 illustrates a circuit diagram of a display including a plurality of output switches implemented as a transmission gate according to some example embodiments.

As shown in FIG. 13, each, or one or more, of the plurality of output switches 37_1 to 37_*m* is implemented as a transmission gate in which an n-channel type of transistor and a p-channel type of transistor are connected in parallel. The n-channel type of transistor and the p-channel type of transistor are connected in parallel, and two control signals having inverted phases are respectively inputted to the gates of the respective transistors. The gate of the n-channel type of transistor configuring the transmission gate may be a control terminal, and the gate of the p-channel type of transistor may be an inverted control terminal.

The output control signal SOUT_EN is a signal supplied to the control terminal of the transmission gate of the plurality of output switches 37_1 to 37_*m*, and the output control signal (inverted output control signal) SOUT_ENB in which the output control signal SOUT_EN is inverted is a signal supplied to the inverted control terminal of the transmission gate. The on-level of the output control signal SOUT_EN may be an high level, the on-level of the inverted output control signal SOUT_ENB may be a low level, the off-level of the output control signal SOUT_EN may be a low level, and the off-level of the inverted output control signal SOUT_ENB may be a high level.

Figure 14:
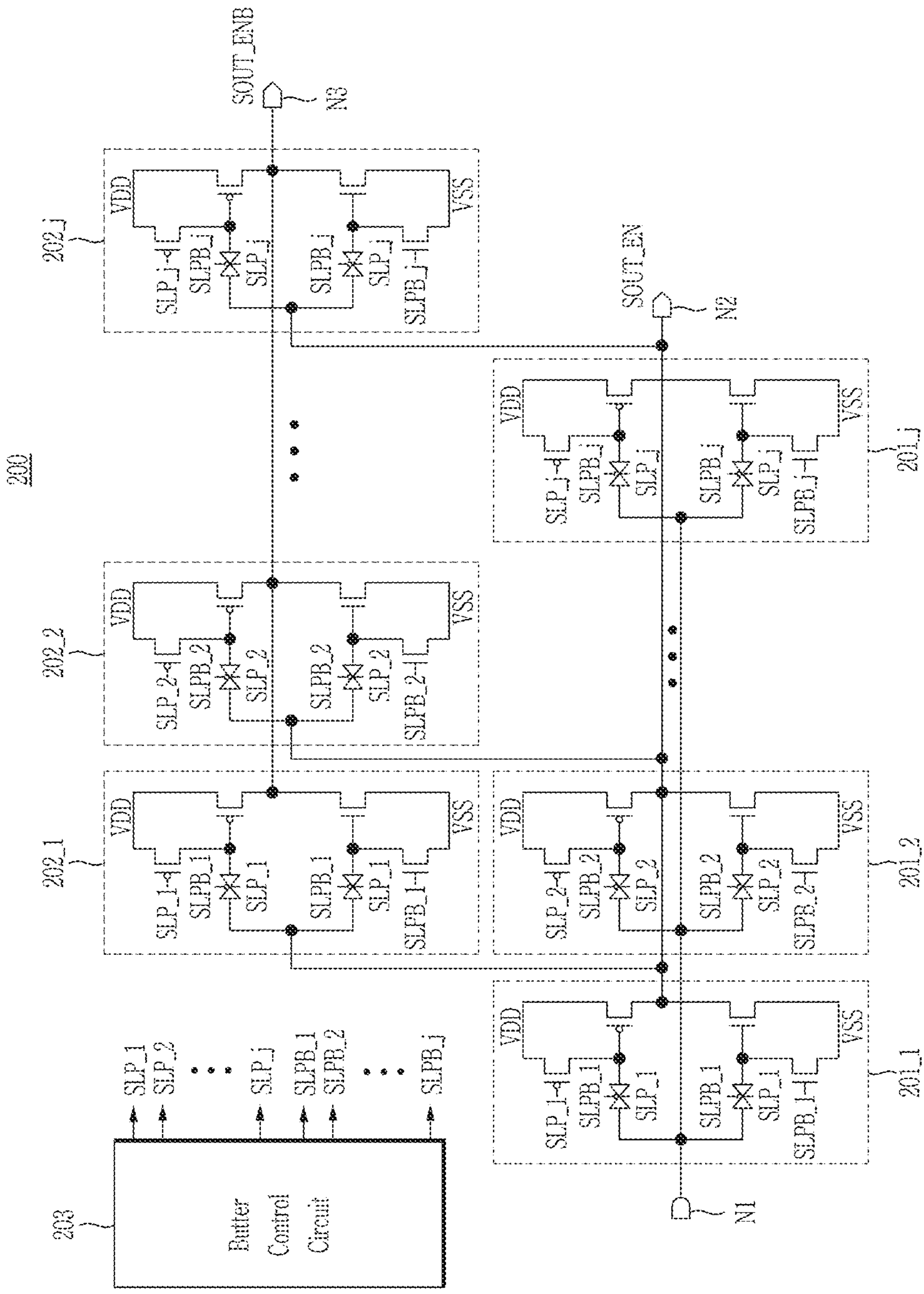
FIG. 14 illustrates a configuration of a source control circuit for controlling a plurality of output switches implemented as a transmission gate.

FIG. 14 illustrates a configuration of a source control circuit for controlling a plurality of output switches implemented as a transmission gate.

A source control circuit 200 shown in FIG. 14 may control both the on-slew rate and the off-slew rate of the output control signal SOUT_EN and the inverted output control signal SOUT_ENB. However, the present inventive concepts are not limited thereto, and some example embodiments shown in FIG. 14 may be applied to the source control circuit 60 shown in FIG. 4. As shown in FIG. 14, the source control circuit 200 may include a plurality of buffers 201_1 to 201_*j* and 202_1 to 202_*j* and/or a buffer control circuit 203.

The buffer control circuit 203 has the same configuration as the buffer control circuit 62 described above, and the plurality of buffers 201_1 to 201_*j* may be the same as the plurality of buffers 101_1 to 101_*j*. A detailed configuration of the plurality of buffers 201_1 to 201_*j* and 202_1 to 202_*j* may be the same as the detailed configuration of the buffer 61_1 described above.

Each, or one or more, of input terminals of the plurality of buffers 202_1 to 202_*j* is connected to a corresponding output terminal of the plurality of buffers 201_1 to 201_*j*, and the output terminals of the plurality of buffers 202_1 202_*j* are connected to one node N3. Since all, or one or more, of the output terminals of the plurality of buffers 201_1 to 201_*j* are connected to the node N2, substantially, buffers operated by the buffer control circuit 203 among the plurality of buffers 202_1 to 202_*j* generate an output according to the output control signal SOUT_EN, and a sum of the outputs of the corresponding buffers is the inverted output control signal SOUT_ENB. The inverted output control signal SOUT_ENB is outputted from the output terminals of the plurality of buffers 202_1 to 202_*j*.

The on-slew rate and the off-slew rate of the inverted output control signal SOUT_ENB may be controlled by buffers operating according to the plurality of slope signals SLP_1 to SLP_j and the plurality of inverted slope signals SLPB_1 to SLPB_j among the plurality of buffers 202_1 to 202_*j*. For example, the on-slew rate and the off-slew rate of the inverted output control signal SOUT_ENB may increase as the distance between each, or one or more, of the plurality of display areas AR_1 to AR_n and the source drivers 30_1 to 30_*k* increases, or may decrease as the distance therebetween decreases.

Each, or one or more, of the plurality of buffers 202_1 to 202_*j* may receive the output control signal SOUT_EN, and may operate according to each, or one or more, of the plurality of slope signals SLP_1 to SLP_j and each, or one or more, of the plurality of inverted slope signals SLPB_1 to SLPB_j to generate the inverted output control signal SOUT_ENB according to the output control signal SOUT_EN. As described above, when respective driving abilities of the plurality of buffers 202_1 to 202_*j* are different, the driving abilities of buffers operating among the plurality of buffers 202_1 to 202_*j* may be combined to control the on-slew rate and the off-slew rate. Alternatively, when the driving abilities of the plurality of buffers 202_1 to 202_*j* are the same, the on-slew rate and the off-slew rate may be controlled according to the number of operating buffers among the plurality of buffers 202_1 to 202_*j*.

Figure 15:
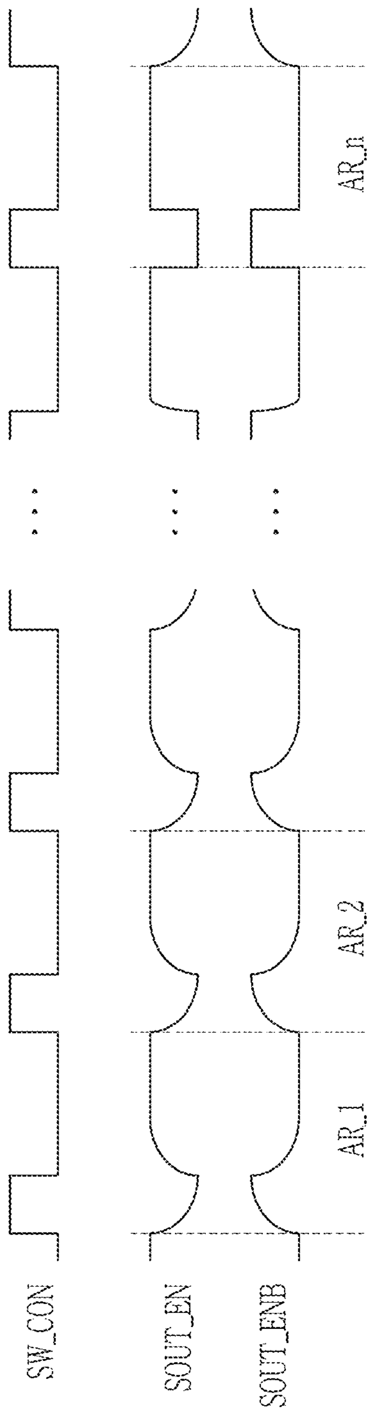
FIG. 15 illustrates a waveform diagram of waveforms of an output control signal and an inverted output control signal for one frame in a display device according to some example embodiments.

FIG. 15 illustrates a waveform diagram of waveforms of an output control signal and an inverted output control signal for one frame in a display device according to some example embodiments.

As shown in FIG. 15, the output control signal SOUT_EN and the inverted output control signal SOUT_ENB have inverted phases, and have waveforms in which the on-slew rate and the off-slew rate increase as each, or one or more, of the plurality of display areas AR_1 to AR_n moves away from the plurality of source drivers 30_1 to 30_*k*. As shown in FIG. 15, the off-slew rate and the on-slew rate of the output control signal SOUT_EN and the inverted output control signal SOUT_ENB for the display area AR_1 are the lowest. The off-slew rate and the on-slew rate of the output control signal SOUT_EN and the inverted output control signal SOUT_ENB for the display area AR_2 are the second lowest, and the off-slew rate and the on-slew rate of the output control signal SOUT_EN and the inverted output control signal SOUT_ENB for the last display area AR_n are the highest.

Figure 16:
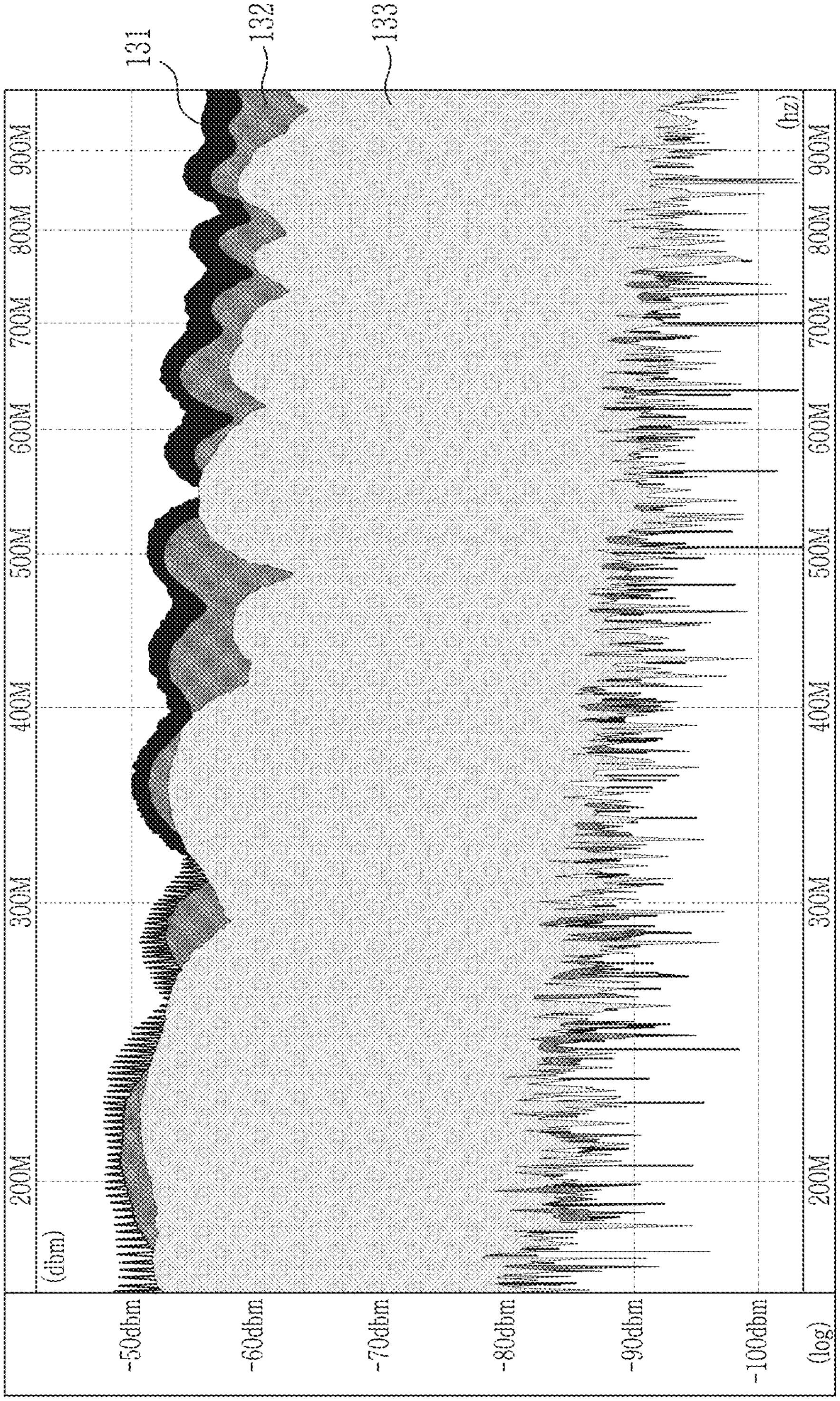
FIG. 16 illustrates a simulation graph of an effect of improving an EMI characteristic according to some example embodiments.

FIG. 16 illustrates a simulation graph of an effect of improving an EMI characteristic according to some example embodiments.

FIG. 16 is a graph illustrating noise generated by the operation of the source driver when a driving frequency of the source driver is a value displayed on an x-axis of the graph. A simulation was performed under a condition in which a display panel was divided into 100 display areas and a slew rate of an output control signal was controlled. A graph 131 is a noise graph when some example embodiments are not applied, a graph 132 is a noise graph when the on-slew rate of the output control signal is controlled according to the position of the display area, and a graph 133 is a noise graph when the on-slew rate and the off-slew rate of the output control signal are controlled according to the position of the display area.

As shown in FIG. 16, the graph 133 has the lowest noise and the narrowest range, the graph 132 has the second lowest noise and the second narrowest range, and the graph 133 has the highest noise and the widest range. That is, it can be seen that the EMI characteristic is good in the order of the graph 133, the graph 132, and the graph 131.

Table 1 below shows a noise root mean square (RMS) value for each frequency band for each of the graphs 131, 132, and 133.

As can be seen from Table 1, it can be seen that the noise RMS when controlling both the on-slew rate and the off-slew rate has the least noise in all frequency bands. Next, it can be seen that the noise RMS when controlling the on-slew rate is small in all frequency bands. The unit of the numerical value representing the noise is [dBm], the unit of the frequency band is [MHz], and the values in the table are RMS values.

TABLE 1

| Graph | 180-220 | 650-750 | 750-850 | Difference | 180-220 | 650-750 | 750-850 |
|---|---|---|---|---|---|---|---|
| 131 | −59.73 | −65.66 | −66.91 | | | | |
| 132 | −60.54 | −66.45 | −67.74 | 132-131 | −0.81 | −0.79 | −0.83 |
| 133 | −62.45 | −67.63 | −69.21 | 133-131 | −2.72 | −1.97 | −2.30 |

Figure 17:
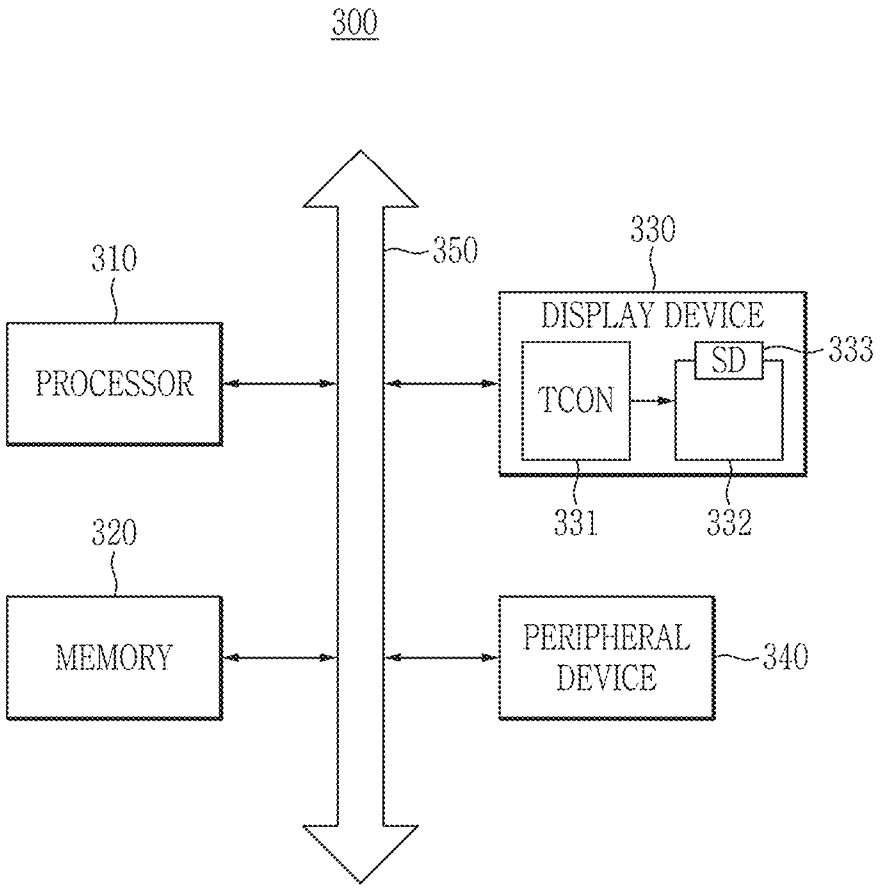
FIG. 17 illustrates a drawing for explaining a semiconductor system according to some example embodiments.

FIG. 17 illustrates a drawing for explaining a semiconductor system according to some example embodiments.

Referring to FIG. 17, a semiconductor system 300 according to some example embodiments may include a processor 310, a memory 320, a display device 330, and a peripheral device 340 that are electrically connected to a system bus 350.

The processor 310 controls input and output of data of the memory 320, the display device 330 and/or the peripheral device 340, and may perform image processing of an image signal transmitted between the corresponding devices.

The memory 320 may include a volatile memory such as a dynamic random access memory (DRAM) and/or a non-volatile memory such as a flash memory. The memory 320 may be configured with a DRAM, a phase-change random access memory (PRAM), a magnetic random access memory (MRAM), a resistive random access memory (ReRAM), a ferroelectric random access memory (FRAM), a NOR flash memory, a NAND flash memory, and a fusion flash memory (for example, a memory in which a static random access memory (SRAM) buffer, a NAND flash memory, and a NOR interface logic are combined). The memory 320 may store image data obtained from the peripheral device 340 or an image signal processed by the processor 310.

The display device 330 includes a timing controller (TCON) 331, a display panel 332, and/or a source driver (SD) 333, and may store an image signal supplied through the system bus 350 in a frame memory included in the timing controller 331 to display it on the display panel 332. The source driver 333 may generate an output control signal and an inverted output having an on-slew rate or an on-slew rate and an off-slew rate controlled according to a position of each, or one or more, of a plurality of display areas of the display panel 332 according to some example embodiments, and may provide a plurality of data signals to each, or one or more, display area according to the output control signal and the inverted output control signal.

The peripheral device 340 may be a device that converts a moving image and/or a still image captured by a camera, a scanner, and/or a webcam into an electrical signal. An image signal obtained through the peripheral device 340 may be stored in the memory 320, or may be image-processed by the processor 310 in real time to be supplied to the display device 330.

The semiconductor system 300 may be provided in a mobile electronic product such as a smart phone, but is not limited thereto, and may be provided in various electronic products that display images.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been described in connection with some example embodiments, it is to be understood that the inventive concepts are not limited to the example embodiments, but, on the contrary, are intended to cover various modifications and equivalent arrangements included within the spirit and scope of the appended claims.

What is claimed is:

1. A display device comprising:

a display panel including a plurality of data lines;

a source driver including a plurality of output switches connected to the plurality of data lines and configured to supply a plurality of data signals to the plurality of data lines during a period in which the plurality of output switches are turned on by an output control signal; and a source control circuit configured to differently control an on-slew rate of the output control signal for each of a plurality of display areas of the display panel according to a distance between each display area and the source driver, the source control circuit including a plurality of buffers including an input terminal, the input terminal configured to receive a common switch control signal instructing the supply of the plurality of data signals to the plurality of data lines, the common switch control signal being a binary signal.

2. The display device of claim 1, wherein the source control circuit includes:

an output terminal configured to output the output control signal; and a buffer control circuit configured to operate a buffer of the plurality of buffers according to a distance between each of the display areas and the source driver.

3. The display device of claim 2, wherein each of the plurality of buffers includes:

two transistors connected between a first power voltage and a second power voltage; and a first transmission gate connected between a gate of a first transistor connected to the first power voltage and the input terminal, among the two transistors, wherein a node to which the two transistors are connected is connected to the output terminal.

4. The display device of claim 3, wherein in each of the plurality of buffers, among the two transistors, a gate of a second transistor connected to the second power voltage is connected to the input terminal.

5. The display device of claim 3, wherein the buffer control circuit is configured to generate an on-level slope signal and an on-level inverted slope signal that turn on the first transmission gate of the buffer to be operated among the plurality of buffers, and generate an off-level slope signal and an off-level inverted slope signal that turn off the first transmission gate of remaining buffers of the plurality of buffers excluding the buffer to be operated among the plurality of buffers.

6. The display device of claim 3, wherein each of the plurality of buffers further includes a second transmission gate connected between a gate of a second transistor connected to the second power voltage and the input terminal, among the two transistors.

7. The display device of claim 6, wherein the buffer control circuit is configured to generate an on-level slope signal and an on-level inverted slope signal that turn on the first transmission gate and the second transmission gate of the buffer to be operated among the plurality of buffers, and generate an off-level slope signal and an off-level inverted slope signal that turn off the first transmission gate and the second transmission gate of remaining buffers of the plurality of buffer excluding the buffer to be operated among the plurality of buffers.

8. The display device of claim 1, wherein the source control circuit is configured to decrease a delay period for the output control signal to become an on-level in a horizontal period for each of the plurality of display areas of the display panel as a distance between each display area and the source driver increases.

9. The display device of claim 1, wherein the source control circuit is configured to differently control an off-slew rate of the output control signal for each of the plurality of display areas of the display panel according to a distance between each display area and the source driver.

10. The display device of claim 9, wherein the source control circuit is configured to decrease a period for the output control signal to become an off-level in a horizontal period for each of the plurality of display areas of the display panel as a distance between each display area and the source driver increases.

11. The display device of claim 1, wherein the source driver further includes:

a shift register configured to receive an image data signal to divide the image data into pixel data units corresponding to each of the plurality of data lines to store a plurality of image data of one pixel row; and a level shifter configured to level-shift the plurality of image data, wherein the shift register is further configured to provide the plurality of image data of the one pixel row to the level shifter according to a latch signal, and wherein the latch signal includes an on-pulse that occurs after the output control signal decreases to an off-level according to an off-slew rate.

12. The display device of claim 1, wherein the plurality of output switches are a plurality of transmission gates, control terminals of the plurality of transmission gates are configured to receive the output control signal, and inverted control terminals of the plurality of transmission gates are configured to receive an inverted output control signal of which the output control signal is inverted.

13. A display device comprising:

a display panel including a plurality of data lines, a plurality of gate lines, and a plurality of pixels connected to the plurality of data lines and the plurality of gate lines;

a plurality of output switches including an output terminal connected to one end of each of the plurality of data lines, the plurality of output switches configured to switch according to an output control signal;

a plurality of amplifiers including output terminals connected to input terminals of the plurality of output switches; and a source control circuit configured to differently control an on-slewing delay of the output control signal for each of a plurality of display areas of the display panel according to a distance between each display area and the plurality of output switches, the source control circuit including a plurality of buffers including an input terminal, the input terminal configured to receive a common switch control signal instructing supply of a plurality of data signals to the plurality of data lines, the common switch control signal being a binary signal, wherein the on-slewing delay is a period during which the output control signal is changed from an off-level to an on-level.

14. The display device of claim 13, wherein the source control circuit is configured to control, for each of the plurality of display areas of the display panel, the on-slewing delay of the output control signal to be shorter as a distance between each display area and the plurality of output switches increases.

15. The display device of claim 13, wherein the source control circuit is configured to differently control, for each of the plurality of display areas of the display panel, an off-slewing delay of the output control signal according to a distance between each display area and the plurality of output switches, wherein the off-slewing delay is a period during which the output control off is changed from an on-level to an off-level.

16. The display device of claim 15, wherein the source control circuit is configured to control, for each of the plurality of display areas of the display panel, the on-slewing delay and the off-slewing delay of the output control signal to be shorter as a distance between each display area and the plurality of output switches increases.

17. The display device of claim 13, wherein the source control circuit includes:

an output terminal to which the output control signal is outputted; and a buffer control circuit configured to operate a buffer according to a distance between each of the display areas and the plurality of output switches among the plurality of buffers.

18. The display device of claim 17, wherein the buffer control circuit is configured to increase a number of buffers of the plurality of buffers to operate as a distance between each display area and a source driver increases.

19. A driving method of a display device including a display panel and a plurality of output switches connected to a plurality of data lines, the method comprising:

changing, in a first horizontal period for a first display area of the display panel, an output control signal to an on-level during a first delay period from a starting time point of the first horizontal period;

changing, in a second horizontal period for a second display area of the display panel, the output control signal to an on-level during a second delay period from a starting time point of the second horizontal period;

changing the output control signal to an off-level during a third delay period in the first horizontal period; and changing the output control signal to an off-level during a fourth delay period in the second horizontal period, wherein, in the display panel, the first display area is closer to the plurality of output switches than the second display area, and the first delay period is longer than the second delay period, and wherein the third delay period is longer than the fourth delay period.

* * * * *